United States Patent
Kane et al.

(10) Patent No.: US 8,101,087 B2
(45) Date of Patent: Jan. 24, 2012

(54) ELEMENT REMOVAL PROCESS

(75) Inventors: Terrence P. Kane, Glen Ellyn, IL (US); Raymond Joseph Lovett, Morgantown, WV (US); Steven Alan Bouse, Elmhurst, IL (US)

(73) Assignee: Global Materials Technologies, Inc., Buffalo Grove, IL (US)

( * ) Notice: Subject to any disclaimer, the term of this patent is extended or adjusted under 35 U.S.C. 154(b) by 321 days.

(21) Appl. No.: 12/257,630

(22) Filed: Oct. 24, 2008

(65) Prior Publication Data

US 2009/0242483 A1 Oct. 1, 2009

Related U.S. Application Data

(63) Continuation-in-part of application No. 12/058,609, filed on Mar. 28, 2008.

(51) Int. Cl.
*C02F 1/70* (2006.01)

(52) U.S. Cl. ........ 210/719; 210/726; 210/757; 210/911; 210/912

(58) Field of Classification Search ................ 210/198.1
See application file for complete search history.

(56) References Cited

U.S. PATENT DOCUMENTS

| | | | | |
|---|---|---|---|---|
| 1,604,235 A * | 10/1926 | Odom | ........................ | 208/246 |
| 3,043,432 A * | 7/1962 | Megesi | ........................ | 210/99 |
| 4,405,464 A * | 9/1983 | Baldwin et al. | ............... | 210/717 |
| 4,523,993 A * | 6/1985 | Farber | ........................ | 210/297 |
| 4,806,264 A | 2/1989 | Murphy | ........................ | 210/695 |
| 5,298,170 A * | 3/1994 | Woog | ........................ | 210/719 |
| 5,472,176 A * | 12/1995 | Azzara | ........................ | 266/170 |
| 5,494,582 A | 2/1996 | Goodman | ........................ | 210/631 |
| 5,510,040 A | 4/1996 | Miller et al. | ................... | 210/721 |
| 5,641,452 A * | 6/1997 | Azzara | ........................ | 266/101 |
| 5,820,762 A * | 10/1998 | Bamer et al. | ................... | 210/661 |
| 5,972,814 A | 10/1999 | Schild, III et al. | ............ | 442/377 |
| 6,183,644 B1 | 2/2001 | Adams et al. | ................... | 210/611 |
| 6,249,941 B1 | 6/2001 | Krupnik et al. | ................ | 29/4.51 |
| 6,270,662 B1 * | 8/2001 | Gibson et al. | ................. | 210/163 |
| 6,602,421 B2 | 8/2003 | Smith | ........................ | 210/662 |
| 6,942,807 B1 * | 9/2005 | Meng et al. | ................... | 210/719 |
| 7,166,228 B2 * | 1/2007 | Ludwig et al. | ................. | 210/719 |
| 7,854,330 B2 * | 12/2010 | Olsta et al. | ................... | 210/502.1 |
| 7,897,049 B2 * | 3/2011 | Ghosh et al. | ................... | 210/631 |
| 2005/0082233 A1 | 4/2005 | Ludwig et al. | ................ | 210/747 |
| 2007/0181511 A1 | 8/2007 | Smith et al. | .................... | 210/792 |
| 2007/0278159 A1 | 12/2007 | Ghosh et al. | ................... | 210/749 |

OTHER PUBLICATIONS

"Information and Price Sheet", GMT Steel Wool Reels and Hand Pads, Global Material Technologies, Inc. (Nov. 2006).

* cited by examiner

*Primary Examiner* — Peter A Hruskoci

(74) *Attorney, Agent, or Firm* — J. Peter Paredes; Rosenbaum & Silvert, P.C.

(57) ABSTRACT

A process and apparatus for removing elements is described herein.

20 Claims, 18 Drawing Sheets

620

_US 8,101,087 B2_

ELEMENT REMOVAL PROCESS

CROSS-RELATED APPLICATIONS

The present application claims priority as a continuation-in-part from U.S. application Ser. No. 12/058,609, filed Mar. 28, 2008, herein incorporated by reference.

BACKGROUND OF THE INVENTION

The field of the invention is a process and apparatus for the removal of elements from water, and more particularly the removal of contaminants, such as selenium.

Selenium is a naturally occurring metalloid element having atomic number 34 and an atomic weight of 78.96. Selenium is widely dispersed in igneous rock. Selenium also appears in large quantities, but in low concentrations, in sulfide and porphyry copper deposits. Moreover selenium is widely associated with various types of sedimentary rock. Inorganic selenium is most commonly found in four oxidation states ($Se^{6+}$, $Se^{4+}$, $Se^0$, and $Se^{2-}$). Selenate ($SeO_4^{2-}$, Se(VI)) and selenite ($SeO_3^{2-}$, Se(IV)) are highly water soluble. Elemental selenium ($Se^0$) is insoluble in water.

Selenium is a common water contaminant throughout the United States and the world and represents a major environmental problem. Human related selenium release originates from many sources including mining operations, mineral processing, abandoned mine sites, petroleum processing, and agricultural run-off. The principal sources of selenium in mining are copper and uranium bearing ores and sulfur deposits. Selenium is commonly found in these mining wastewaters in concentrations ranging from a few micrograms per liter up to more than 12 mg/L. In precious metals operations, waste and process water and heap leachate solutions may contain selenium at concentrations up to 30 mg/L. It has been observed that concentrations of selenate as low as 10 μg/L in water can cause death and birth deformities in waterfowl; therefore, the established regulatory limit is 5 μg/L. Most of these mining operations, including both metal and non-metal mining operations, will need inexpensive and effective selenium removal processes to meet discharge and closure requirements. Additionally, the selenium removal difficulties include the different dissolved species, no direct precipitation chemistries, difficulty of reducing selenate, and sulfate interference.

The present invention attempts to solve these problems, as well as others.

SUMMARY OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

A process and apparatus for removing elements is described herein.

BRIEF DESCRIPTION OF THE FIGURES

The foregoing summary, as well as the following detailed description of preferred embodiments of the invention, will be understood when read in conjunction with the appended drawings. For the purpose of illustrating the invention, there is shown in the drawings embodiments which are presently preferred. It should be understood, however, that the invention is not limited to the precise arrangements and configurations shown.

FIG. 7D is a perspective view of the porous bag layer.

DETAILED DESCRIPTION OF THE PREFERRED EMBODIMENTS

The apparatus and process can be understood more readily by reference to the following detailed description of the apparatus and process and the Examples included therein and to the Figures and their previous and following description. While particular reference is made to the removal of selenium, it is to be understood that the elemental removal process and apparatus may be applied to other elements, as described below.

Figure 1:
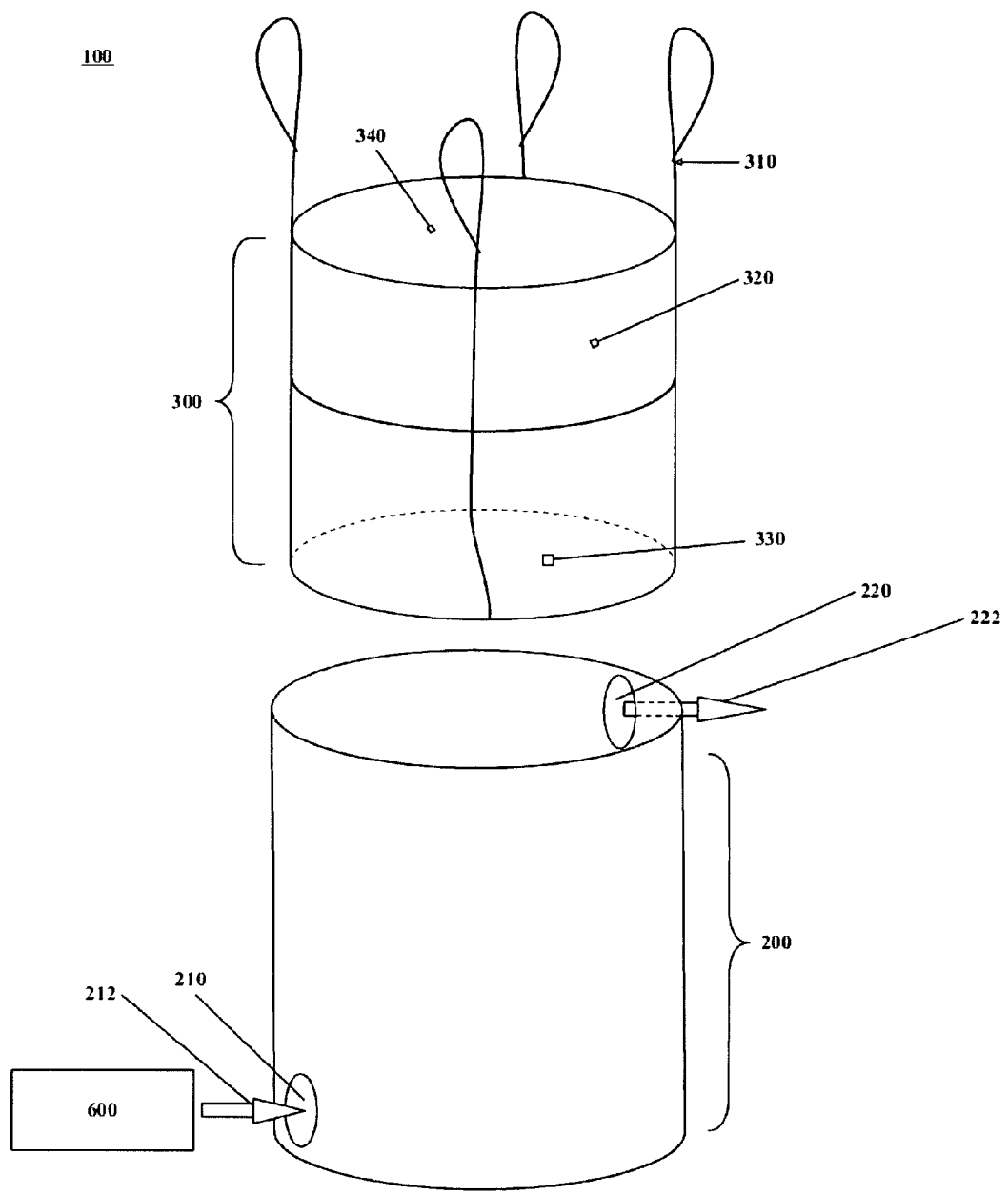
FIG. 1 is a schematic view of one embodiment of the invention.
Figure 2:
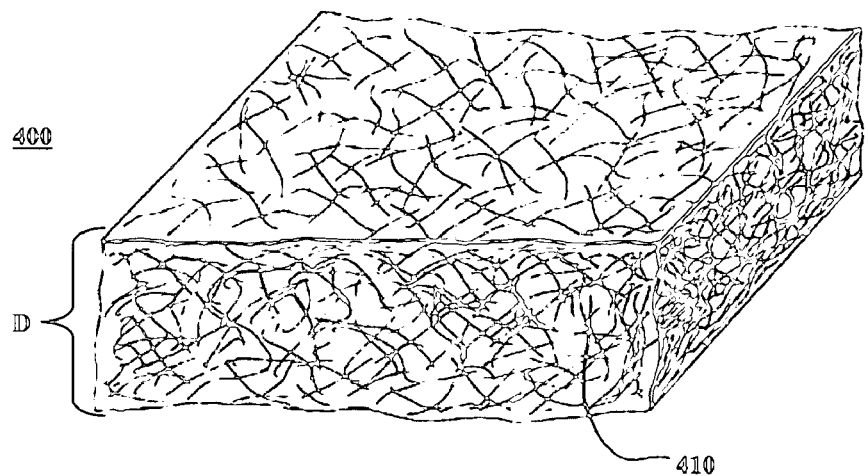
FIG. 2 is a perspective view of the Zero-Valent Iron Fiber ("ZVIF") Packing.

Generally speaking, one embodiment of the element removal process and apparatus is shown in FIG. 1. As shown in FIG. 1, a water treatment cell 100 comprises a container vessel 200, a porous bag 300, and a plurality of Zero Valent Iron Fiber ("ZVIF") packings 400. A cross-section of the ZVIF packing 400 is shown in FIG. 2, and comprises a plurality of metal fibers 410 with a density D. The metal fibers 410 comprise an average cross-sectional diameter d. The container vessel 200 includes an inlet port 210 and an outlet port 220. In one embodiment of the invention, the inlet port 210 may be located at the bottom of the container vessel 200 and the outlet port 220 may be located at the top of the container vessel 200 for bottom-in/top-out fluid flow. In another embodiment of the invention, the inlet port 210 may be located at the top of the container vessel 200, and the outlet port 220 may be located at the bottom of the container vessel 200 for top-in/bottom-out fluid flow. Fluid flow is demonstrated by arrows 212 and 222, whereby a water source containing elements requiring removal enters by way of 212 and exits the treatment cell 100 by way of 222. The porous bag 300 includes a plurality of lift straps 310, a porous bag wall material 320, a porous bottom 330, and a fill 340 of the ZVIF packing 400. The porous bag wall material 320 and the porous bottom 330 includes pores or a mesh cut pattern, such that the fill 340 of the ZVIF packing 400 is maintained and securely held within the porous bag 300 and the fluid flow is transmitted through the porous bag 300.

The fill 340 includes a controlled porosity and density D of the ZVIF packing 400 to treat a particular amount of fluid flow rate and allow for a particular contact time of the water of interest with the ZVIF packing 400. The fill 340 may be defined by the density D of the ZVIF packing 400 and the average diameter d of the metal fibers 410. In one embodiment of the invention, the fill 340 can range in densities from 1 lb/ft$^3$, 5 lb/ft$^3$, 10 lb/ft$^3$, 15 lb/ft$^3$, 20 lb/ft$^3$, 25 lb/ft$^3$, to 50 lb/ft$^3$. The fill 340 may include a variation of densities using the same diameter d of metal fiber from the bottom of the treatment cell 100 to the top of the treatment cell 100 by use of a plurality of porous bag layers 350, as shown in FIG. 7B. Alternatively, the fill 340 may include a plurality of porous bag layers 350 of the same density D of the ZVIF packing 400 with differing metal fiber diameters d ranging from the bottom of the treatment cell 100 to the top of the treatment cell 100. Alternatively, the fill 340 may include a plurality of porous bag layers 350 with differing densities D of the ZVIF packing, whereby each different porous bag layers 350 include differing metal fiber diameters d within each porous bag layer 350. Alternatively, the fill 340 includes a gradient of metal fibers with diameter d in the vertical direction indicated by the z-axis in FIG. 7B, or in the along either horizontal direction indicated by the x-axis and y-axis in FIG. 7B. In all, the density D of the ZVIF packing and the average diameter d of the metal fiber 410 define the total surface area available for selenium removal, further described below. Porosity is the free space in the ZVIF packing 400 in the fill 340 for fluid flow and relates to the maximum fluid flow rate and the volume %. The fluid flow must travel around the metal fibers 410, so the travel path of the fluid flow through the metal fibers 410 is tortuous and decreases the fluid flow rate. Volume % is the percentage of the total volume occupied by ZVIF packing 400 relative to the percentage of open space between the metal fibers 410. In one embodiment of the invention, the ZVIF packing 400 exceeding 2 volume % may have difficulty sustaining good fluid flow rates. 2 volume % of ZVIF packing 400 has 98% open space in the volume and 2% space occupied by the ZVIF packing 400. In one embodiment of the invention, the volume percentages of ZVIF packing may be 0.01 volume % to 0.09 volume %, 0.1 volume % to 1 volume %, 1.1 volume % to 1.9 volume %, and the like.

One or more pumps (not shown) may be utilized to facilitate flow through inlet port 210 or outlet port 220. Additionally, sieve filters (not shown) may be placed on the inlet port 210 or outlet port 220 to retain solid materials that may plug the medium at the inflow or remove solid reaction products at the outlet port 220. The solid material may include debris, scavenging material, and/or compost that may interact or clog the treatment cell 100. Valves may be located on the inlet port 210 and/or the outlet port 220 to control the flow rate of contaminated water into the treatment cell 100. A top-in/bottom-out fluid flow may include a pipe drain that rises up the side of the tank to below the inlet port 210, such that the container vessel 200 only drains after being filled with contaminated water. The inlet port 210 flow rate may be set to control the residence time. An oxygen trap 600 may be included to remove atmospheric oxygen before the contaminated water enters the treatment cell 100 and at the air/solid interface of the metal fiber 400. The oxygen trap 600 comprises of a replaceable iron cartridge or some commercially available device to reduce the amount of oxygen entering the inlet port 210 or at the air/metal fiber 410 interface. Alternatively, a vacuum may be coupled with the treatment cell to remove oxygen and oxidizing air.

In operation, contaminated water flows into the treatment cell 100 through inlet port 210, where the contaminated water flows through the porous bag wall material 320 and contaminants are removed through an interaction with the fill 340 of the ZVIF packing 400. The residence time is the time the contaminated water interacts with the ZVIF packing within the treatment cell 100. The residence time can be roughly determined by calculating the volume in gallons of ZVIF packing 400, and then determining the time it would take to displace that volume at a particular flow rate. The shortest residence times is determined by the permeability of the medium, or fill material 340. At some flow, water will not penetrate the medium efficiently and water will overflow the vessel 200 for top-in/bottom-out flow, or physically push the medium upward by water pressure for bottom-in/top-out fluid flow. The upper limit on the residence time depends on the lowest possible flow available to the vessel 200. In one embodiment of the invention, contaminated water containing selenium as selenite or selenate contacts the ZVIF packing 400 begins to remove selenium by reduction of selenate and selenite with Fe(0) (which is elemental or zero-valent iron "ZVI"), as shown by the following equations:

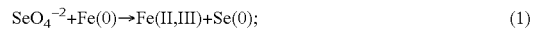
$$SeO_4^{-2} + Fe(0) \rightarrow Fe(II,III) + Se(0); \qquad (1)$$

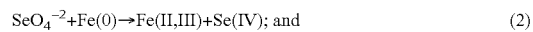
$$SeO_4^{-2} + Fe(0) \rightarrow Fe(II,III) + Se(IV); \text{ and} \qquad (2)$$

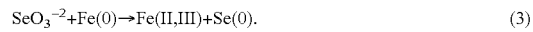
$$SeO_3^{-2} + Fe(0) \rightarrow Fe(II,III) + Se(0). \qquad (3)$$

Figure 3:
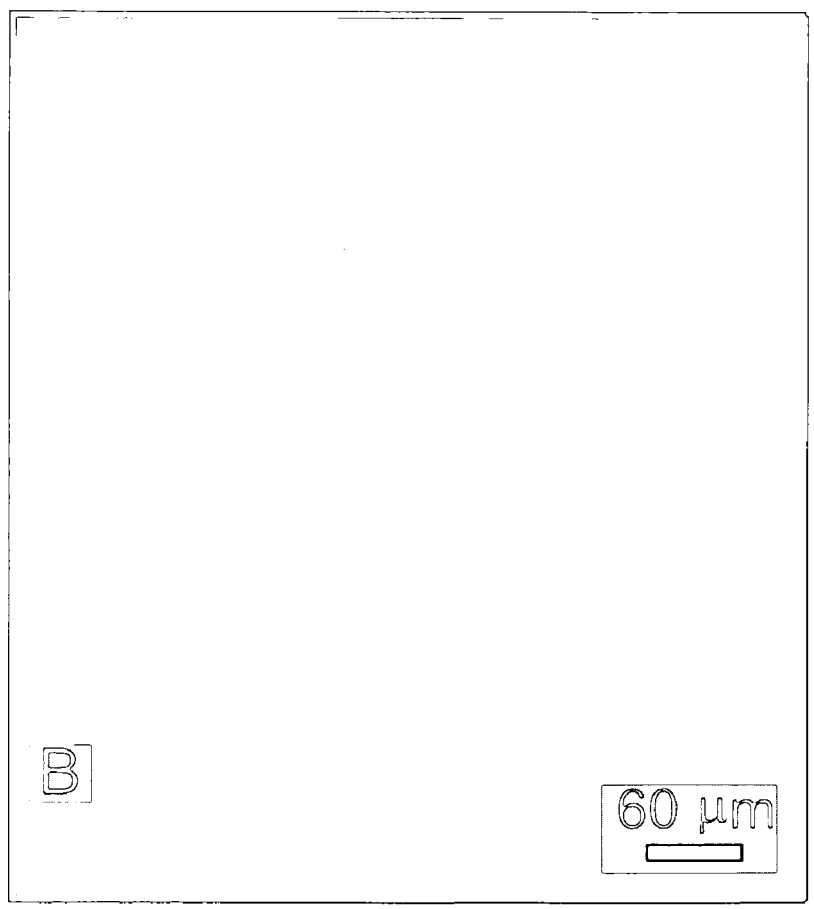
FIG. 3 is a light microscope image of view of the ZVIF packing after selenium removal.

When selenate and selenite react with ZVI Fe(0) oxidizes to Fe(II) or Fe(III) and insoluble Se(0) precipitates out of solution or adsorbs on the iron surface. If selenate is reduced to Se(IV) rather than Se(0), the resultant Se(IV) can adsorb to the iron fibers or is immobilized by Fe(III) oxides that are formed in the reaction. The synchrotron studies found Se(IV) adsorbed on the surface of the iron fiber. Iron serves as an electron source and as a substrate for Se(IV) adsorption. The ZVIF packing 400 reduces selenate to Se(IV) and Se(0) by a direct surface reaction. The reaction products are then immobilized by adherence at the ZVI reaction site or iron reaction products, as shown in FIG. 3. When the ZVIF packing 400 has completely reacted, the ZVIF packing 400 ceases to remove selenium and must be replaced. The ZVIF packing 400 may be removed from the treatment cell 100 by slowly lifting the lift straps 310 out of the container vessel 200, allowing the water to drain out into the container vessel 200, and removing the porous bag 300 from the container vessel 200. The removed ZVIF packing 400 is replaced with a new porous bag 300 with new ZVIF packing 400 for additional selenium removal. In one embodiment of the invention, a suitably designed system using the ZVIF packing 400 effectively removes selenium ions from the neutral or slightly alkaline mine water (pH 6-9) to a concentration below 5 µg/L. A neutral to alkaline pH avoids acid dissolution of iron, and in one embodiment of the invention, the pH may be adjusted to a range of pH 6 to a pH 9.

In one embodiment of the invention, other contaminants or low concentration substances in target waters may react with the ZVIF packing 400. For example, Fe(0) may react with one or more of chromium (as chromate), cobalt ions, arsenic (as arsenate or arsenite), cadmium (as $Cd^{+2}$), copper (as $Cu^{+2}$), cyanide, gold, lead, manganese (as permanganate), molybdenum (as molybdate), nickel, nitrate, selenium (as selenate or selenite), technetium (as $TcO^{-4}$), tin, uranium (as uranyl), vanadium (as vanadyl or other oxy species), radionuclides, pathogens (viruses, bacteria, protozoa), and/or halogenated organics such as chlorinated organics, and derivatives thereof. Fe(0) may also react with pesticides and herbicides, such that the pesticides and herbicides are adsorbed to the treatment system. As such, the treatment cell 100 serves as an effective clean-up system for mine water or other contaminated water sources to make contaminant removal more controllable.

Additionally, the Fe(II) produced by the reduction of selenium and dissolved oxygen is further oxidized to Fe(III), forming iron oxide and hydroxide minerals, as illustrated by the following equations:

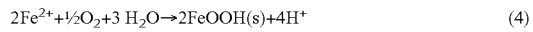

$$2Fe^{2+} + \tfrac{1}{2}O_2 + 3 H_2O \rightarrow 2FeOOH(s) + 4H^+ \quad (4)$$

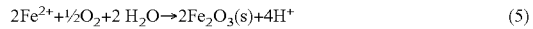

$$2Fe^{2+} + \tfrac{1}{2}O_2 + 2 H_2O \rightarrow 2Fe_2O_3(s) + 4H^+ \quad (5)$$

Equation (4) and (5) shows the formation of various oxyhydroxides of iron, which are colloquially known as "rust" that is associated with ZVI oxidation. The porous bag 300 contains most of the rust materials. In one embodiment, when the ZVIF packing 400 has reacted to exhaustion, the porous bag 300 will contain mostly rust and entrained selenium. Clogging is prevented by the formation of small oxyhydroxide particles and sufficient fluid flow to purge them. In one embodiment, ferrihydrite and goethite may be the first minerals formed.

Metal Fiber

Figure 4:
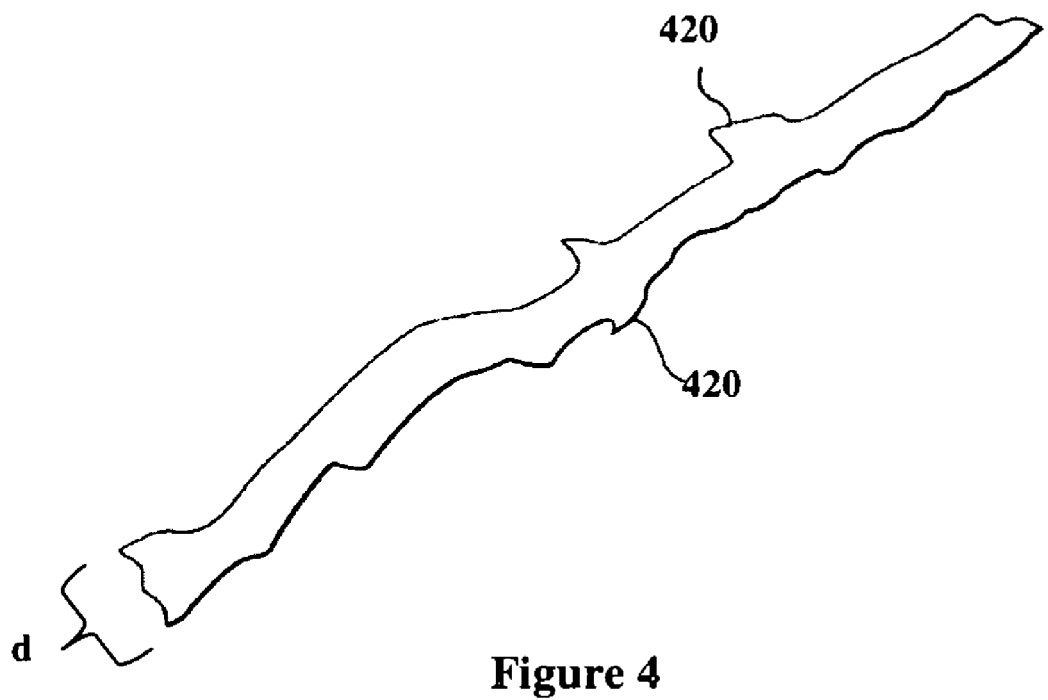
FIG. 4 is an enlarged perspective view of the metal fiber.

The ZVIF packing 400 include a plurality of metal fibers 410, as shown in FIG. 4. Generally speaking, the metal fibers 410 include an average cross-sectional diameter d, as shown in FIG. 4. The metal fibers 410 comprise an average cross-sectional diameter d ranging between about 10 and 125 microns. A superfine metal fiber includes an average cross-sectional diameter d of 25 microns. An extra fine metal fiber includes an average cross-sectional diameter d of 35 microns. A very fine metal fiber includes an average cross-sectional diameter d of 40 microns. A fine metal fiber includes an average cross-sectional diameter d of 50 microns. A medium metal fiber includes an average cross-sectional diameter d of 60 microns. A medium coarse metal fiber includes an average cross-sectional diameter d of 75 microns. A coarse metal fiber includes an average cross-sectional diameter d of 90 microns. An extra coarse metal fiber includes an average cross-sectional diameter d of 100 microns. In one embodiment, the selection of the average cross-sectional diameter d may be dependent on various factors including, but not limited to, concentrations of substances or contaminants of interest, the removal kinetics, and the flow characteristics of various fiber densities, and the like. Alternatively, the average cross-sectional diameter d may include an average fiber width between 10 to 1000 microns.

Figure 20:
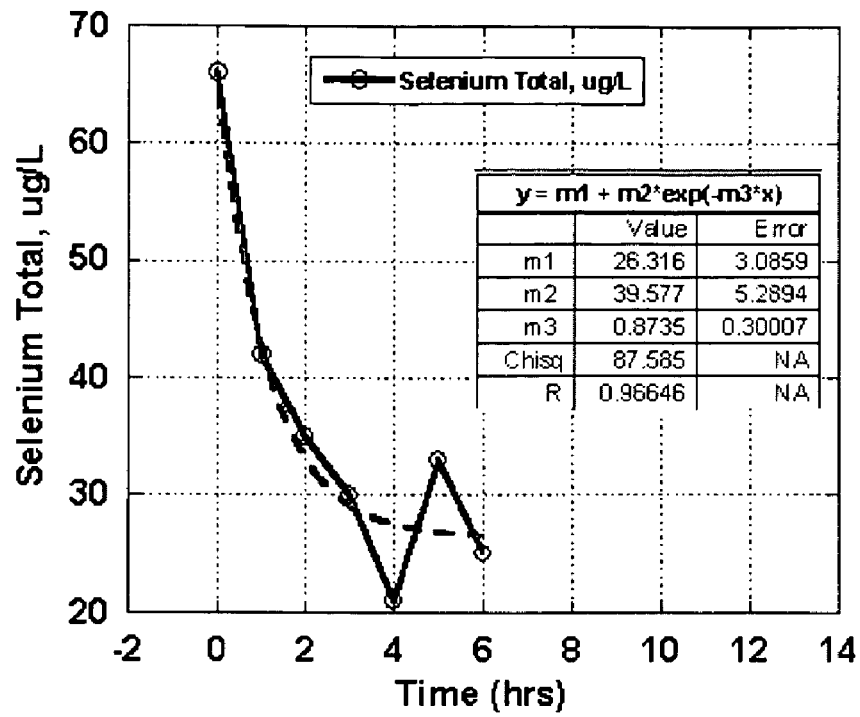
FIG. 20 is a plot of the initial Se removal portion fit to an exponential curve for 0-6 hours.
Figure 21:
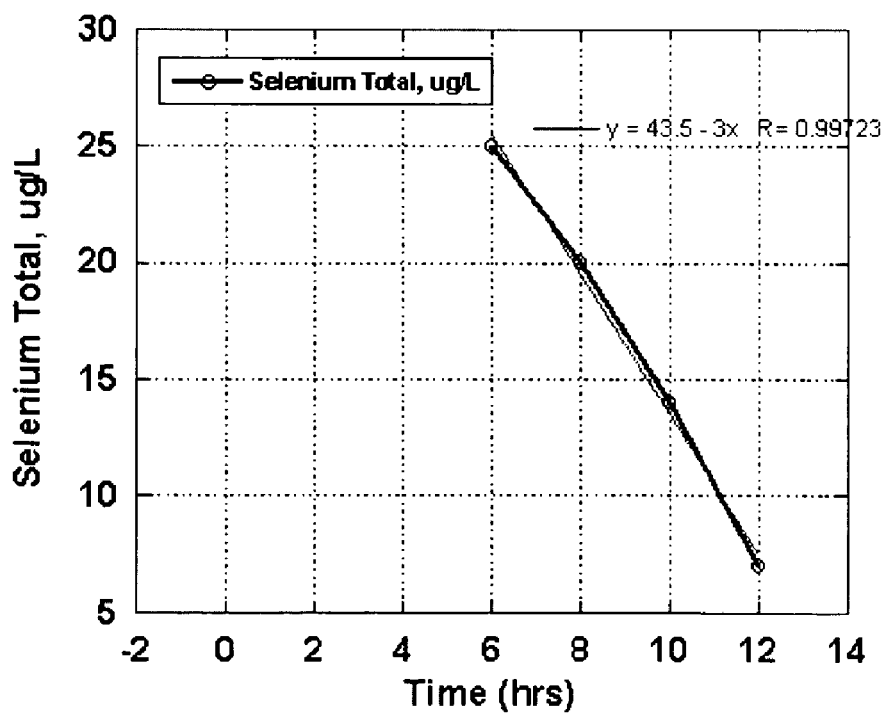
FIG. 21 is a plot of the selenium removal for 6-12 hours showing linear removal rates.

As shown in FIG. 4, in one embodiment of the invention, the ZVI fibers include an irregular cross-section and rough outer surfaces with projections 420 and fissures formed along the outer surfaces. The irregular cross-sections vary continuously along the length of the resulting fibers to provide generally asymmetrical metal fibers in the longitudinal and horizontal direction. The nature of the metal fibers provides increased surface area of the metal fiber for interaction with selenium ions. In one embodiment of the invention, the projections 420 are polycrystalline iron oxides. The increased surface area of the metal fibers increases the rate of reduction of selenium ions for the treatment system and allows for increased removal of selenium, i.e. providing a substrate for the reduction of soluble selenium species to insoluble Se(0) which is retained by surface adhesion or by the irregular cross sections. Selenate can also be reduced and deposited onto the metal fiber 410 surfaces as selenite. The surface area of the metal fibers 410 in the treatment cell 100 is one factor that determines the rate of selenium reduction. The rate of selenium reduction may be given, most generally, by the formula $-d[SeO_4^{-2}]/dt = k[SeO_4^{-2}]^n$. Where k is a rate constant and n is the reaction order. The increased surface area of the metal fiber 400 functionally increases k because the more reactive collisions with the surface area are possible. For a given surface area, the selenium removal has been shown to be first order (n=1) at short reaction times with indications of zero order rate for long reaction times and very low concentrations. Other ions, such as chromate, have first order removal kinetics as well. In one embodiment of the invention, high selenium concentrations and the number of collisions with the metal fiber 400 depends on hoe many selenate molecules are available for collision (first order). As the concentration of selenate falls, the number of collisions with the metal fiber 400 depends on finding fiber, which is zero order in selenate. As shown in FIG. 20, an exponential curve is fitted to the initial selenium removal for 0-6 hours and shows first order removal for the reaction rate. As shown in FIG. 21, selenium removal at later times of 6-12 hours and shows zero order removal for the reaction rate. And the greater fiber densities favor kinetics that is in the first order for selenate to lower selenate concentrations. In one embodiment of the invention, metal fiber densities from 0.5 volume % to 2 volume % remove selenium at favorable rates.

Figure 5:
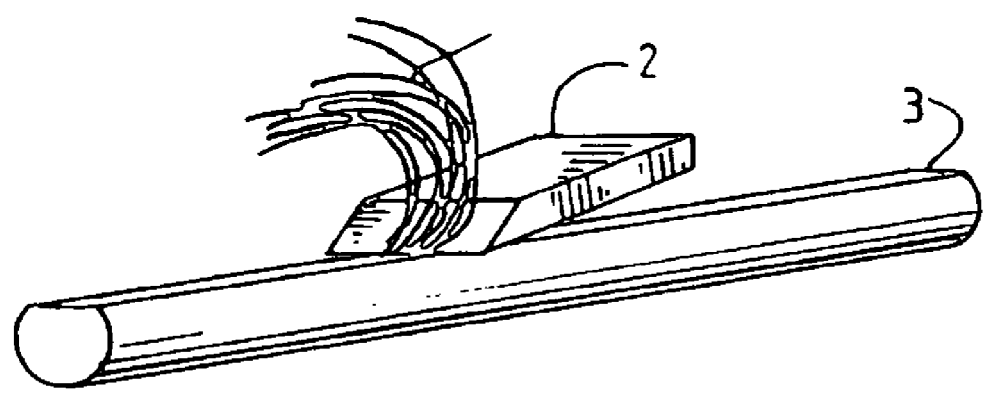
FIG. 5 is a schematic displaying the formation of the metal fiber.

As shown in FIG. 5, in one embodiment of the invention, the metal fibers 400 are produced by shaving a metal wire 1 with a metal member 2 with a succession of serrated blades, as disclosed in commonly assigned U.S. Pat. Nos. 5,972,814 and 6,249,941, which are hereby incorporated by reference. A suitable lubricant, such as oil, is preferably applied to the metal member 2 as it is being shaved by the blades in sufficient quantity so that the metal fibers retain on their outer surface a carding-effective amount of the oil or lubricant. "Carding-effective amount" of oil or lubricant means that the metal fibers, when blended with the nonmetal fibers, can be carded without substantial breakage or disintegration. The lubricant optionally may be applied after the metal fibers are formed. The carding-effective amount of oil generally may be in the range of about 0.3 to 1.0 wt. % oil, more preferably about 0.4 to 0.7 wt. %, based on the total weight of the metal fibers, although lesser or greater amounts may be used depending on the type and average diameter of the metal fibers. Preferably, the metal fibers are made from carbon steel, to result in Zero Valent Iron. However, the metal fibers 410 can also be made from other metals that result in Zero-Valent capabilities, such as copper, silver, palladium, nickel, tin, and the like. Alternatively, the metal fiber 410 may be bimetallic or an alloy of zero-valent metals, such as iron-nickel, iron-palladium, and the like.

Figure 6A:
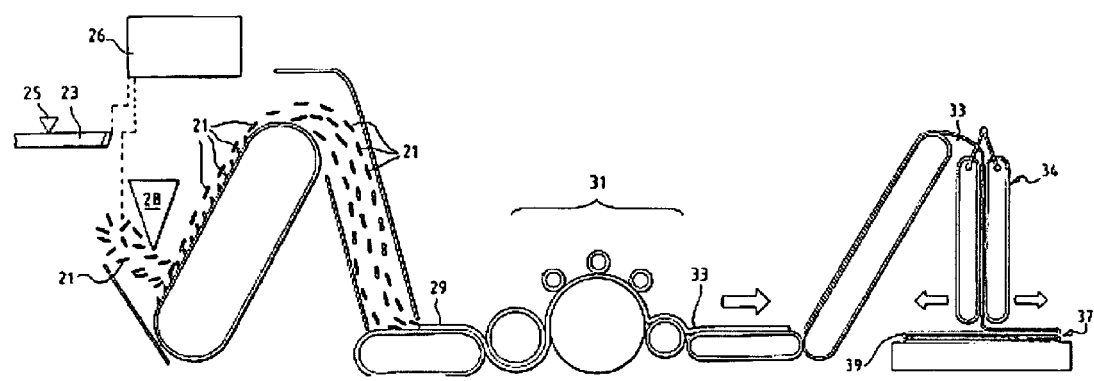
FIG. 6A is a schematic displaying the formation of the ZVIF packing.

Generally speaking, the metal fibers 400 are oriented as an isotropic mass in a randomized orientation after the metal fiber 400. The isotropic mass may be packed into the ZVIF packing 400 to form the fill 340. Alternatively, the metal fibers 400 are cut into staple lengths using a suitable metal fiber cutting apparatus 26 to give the metal fibers a predetermined length, as shown in FIG. 6A. After cut to the predetermined length, the metal fibers 400 may then be stacked to achieve a unit of isotropic mass. The cut fibers 21 are then fed into conventional textile apparatus which separates and blends the mass of fibers 21 in order to form a homogenous blend of fiber 29, as shown in FIG. 6A. The homogenous fiber mass 29 can then be carded in the garnett 31 to form a fiber web 33, which is readily understood by commonly assigned U.S. Pat. No. 6,249,941. The garnett 31 may be any suitable apparatus used in the textile field, with the spacing/number of the cylinders and the garnett wires depending on the size and strength of the metal fibers 21 being acted upon. The carding process generally imparts a slight "machine direction" to the fibers 21. Sufficient oil or other lubricant is retained on the fibers 21 of the homogenous fiber mass 29 when the web is processed by the garnett 31, to prevent undesirable fracturing or disintegration of the web 29. After carding by the garnett 31, the fiber web 33 is lapped by suitable textile apparatus 34 to form a multi-layer structure 37. The lapping apparatus 34 changes the orientation of the fiber web 33 as it is being deposited in successive layers. In this way, the orientation of adjacent ones of the layers 39 are rotated out of alignment from each other by a preselected angle, and the direction of the fibers 21 in the fiber web 33 varies between adjacent layers 39 of the resulting multi-layer structure 37 is interwoven may be used as the ZVIF packing 400.

Figure 6B:
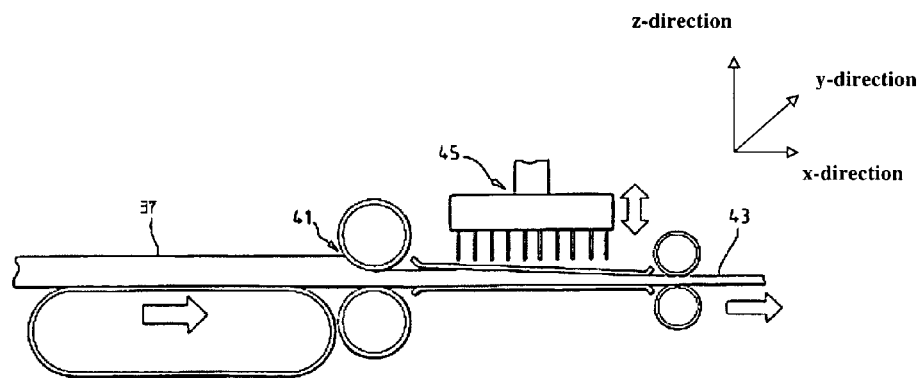
FIG. 6B is a schematic displaying the formation of the ZVIF packing.

In one embodiment of the invention, the multi-layer structure 37 is then fed through a suitable nip 41 and needled or needle-punched by textile apparatus 45, as shown in FIG. 6B. The needling of the multiple layers 39 interengages the fibers 21 of respective layers 39, giving the resulting ZVIF packing 43 improved strength, fiber density, and fiber distribution characteristics for selenium removal. The needling process causes the fibers 21 to be interengaged not only within respective layers 37 but also between the layers 37 (in the "z" direction relative to the layers). The x-direction is the longitudinal machine direction in which the fabric ply exits the textile apparatus. The y-direction is the transverse machine direction in which the fabric ply exits the textile apparatus. And the z-direction is the vertical direction in which the fabric ply exits the textile apparatus. The bias direction is any other direction 0-90 degrees between the x, y, or z-direction, and provides an interwoven and interengaged metal fiber 400 mass.

Figure 7A:
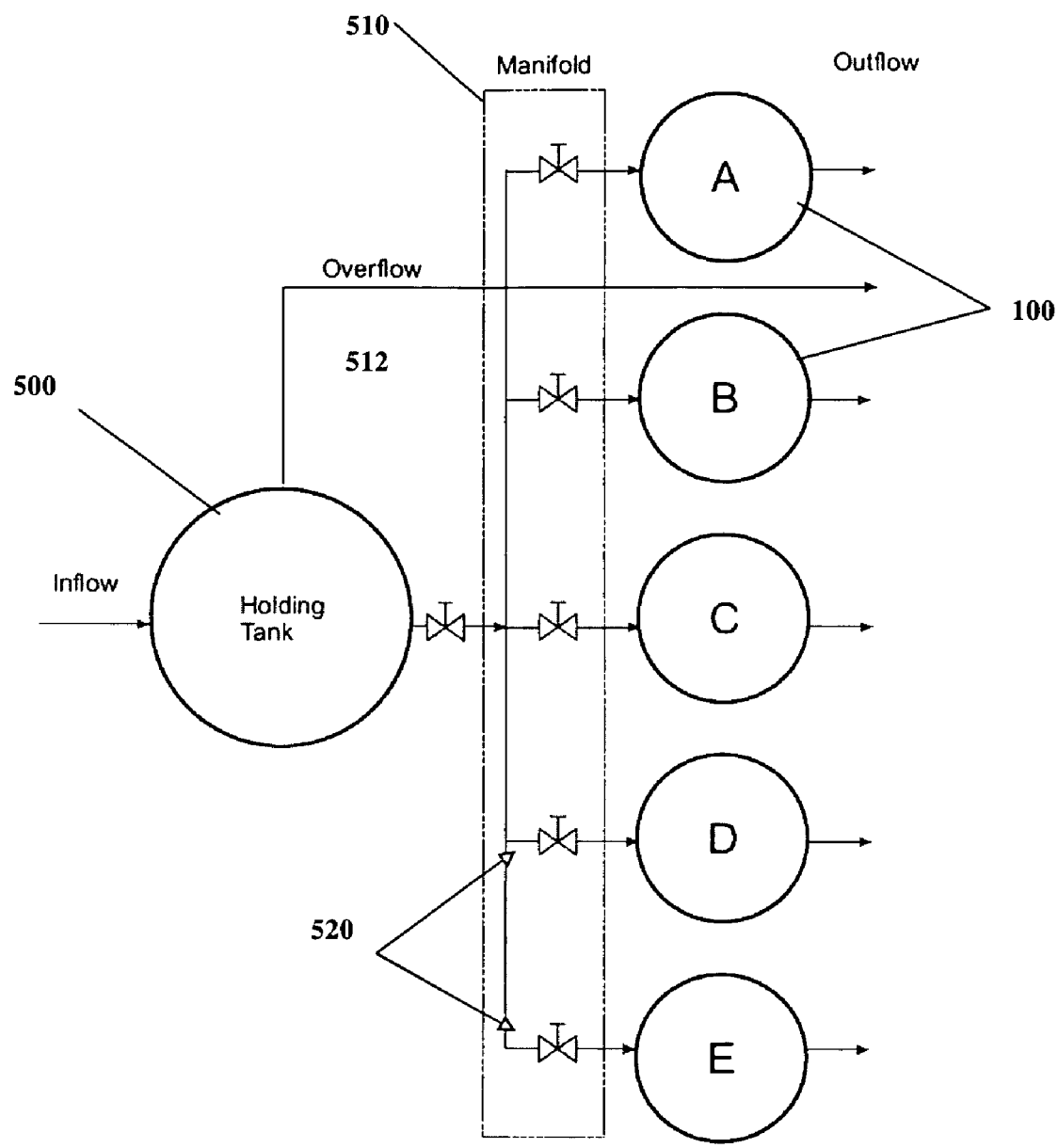
FIG. 7A is a top view of a schematic of one embodiment of the invention.
Figure 7B:
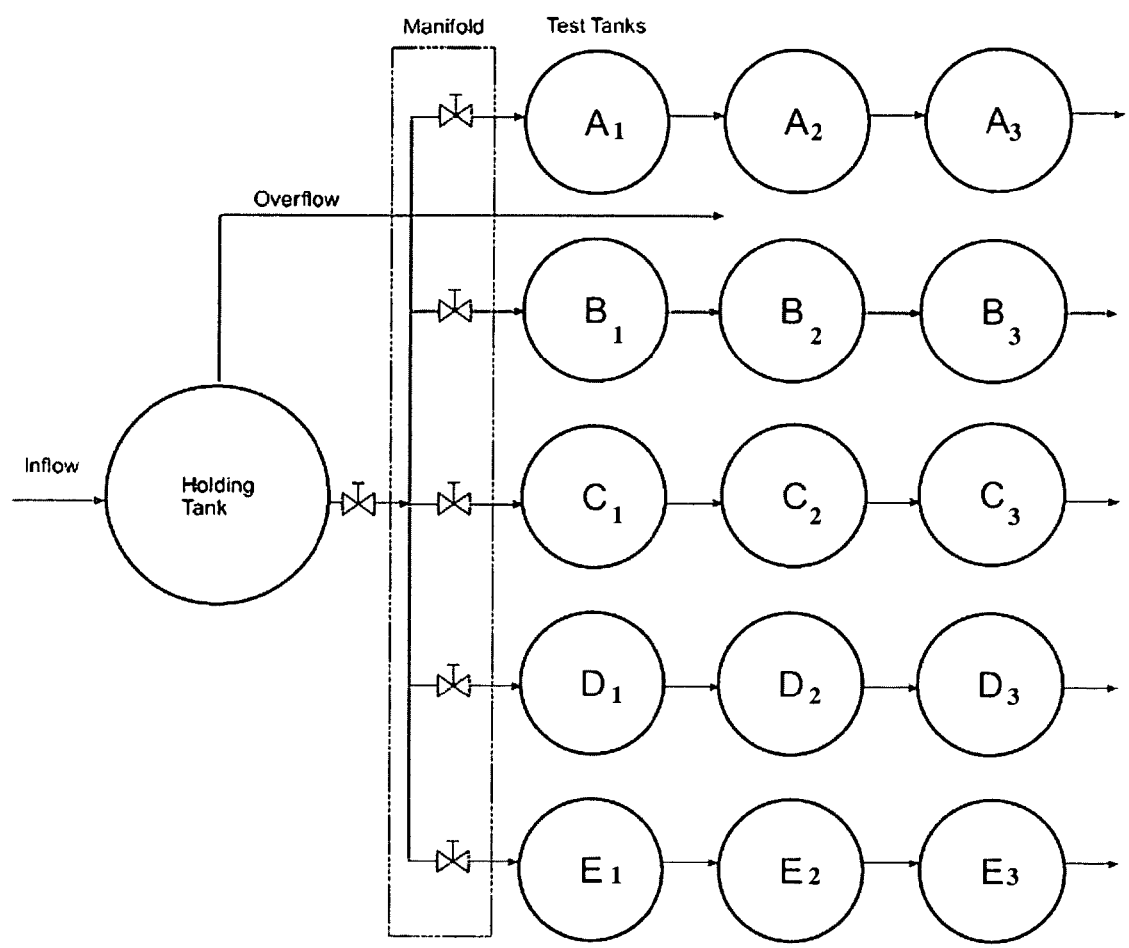
FIG. 7B is a top view of a schematic of another embodiment of the invention.

In one embodiment of the invention, the selenium removal process and apparatus includes a plurality of treatment cells 100 and a holding tank 500, as shown in FIG. 7A. The water of interest flows into the holding tank 500 through an inflow port and includes an overflow port. The holding tank 500 is fluidly connected to a manifold 510 by way of valve 512. The manifold 510 includes a plurality of valves 520, which fluidly communicate to a plurality of treatment cells 100. Generally speaking, the treatment cells 100 are described as previously indicated, and may include any number of treatment cells, which are designated as treatment cells A, B, C, D, and E in FIG. 7A. FIG. 7A displays the plurality of treatment cells 100 arranged in parallel. To treat larger systems and to handle a larger flow volume, after the parallel configuration of the plurality of treatment cells 100, sequential treatment cells 100 may be attached to the treatment cells A, B, C, D, and E, as shown in FIG. 7B. Such a distribution between 5 separate treatment cells into a series train may handle 100 gallon/minute fluid flows. For the series configuration, there can be any number of porous bag layers if required by the levels of selenium.

A parallel configuration of the treatment cells 100 distribute the flow to allow an adequate residence time in the treatment cells 100. Depending on the particular flow rate of the contaminated water, additional treatment cells 100 may be added or shut off by the valve system in the manifold. 510. Moreover, when the treatment cells 100 may be configured in a serial or sequential fashion, one treatment cell 100 is placed in fluid connection with another treatment cell 100, as to give a serial contamination removal processes for additional contaminant removal.

Figure 7C:
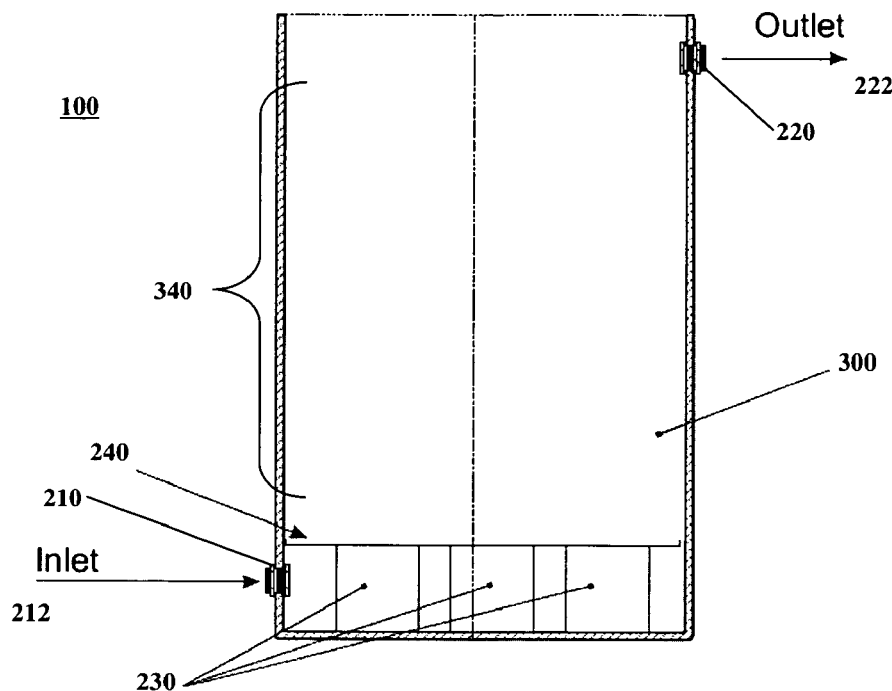
FIG. 7C a side view of one embodiment of the treatment cell.

A side view of one embodiment of the treatment cell 100 is shown in FIG. 7C. The inlet port 210 is located on the bottom of the container vessel 200 and fluid flow from the manifold is indicated by arrow 212. A plurality of spacers 230 are located on the bottom of the container vessel 200 to permit the water to flow into the bottom of the container vessel 200. A porous plate 240 separates the spacers 230 and the porous bag 300. The porous bag 300 includes the fill 340 of the ZVIF packing 400 to remove selenium. The treated water then flows out of outlet port 220 by way of fluid flow indicated by arrow 220, to either another treatment cell 100 or discharged consistent with the objectives of the treatment system.

Figure 7D:
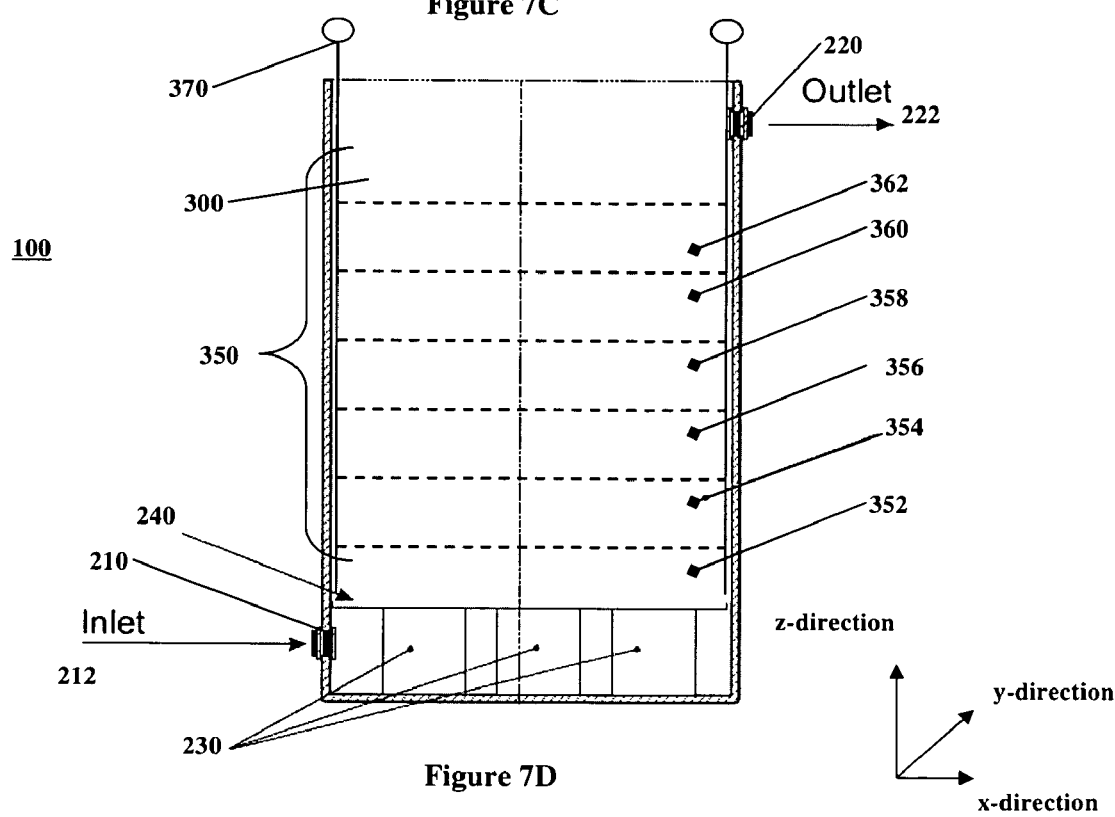
FIG. 7D is a side view of another embodiment of the treatment cell.

As shown in FIG. 7D, in one embodiment of the invention, the porous bag 300 may include a plurality of porous bag layers 350 of different densities of ZVIF packing 400. The porous bag layers 350 include a plurality of lift straps 370, a porous bag wall material, a porous bottom, and a fill of the ZVIF packing 400. The porous bag layers 350 are discrete and separate layers, where each porous bag layer may include a specific density of ZVIF packing 400. The plurality of porous bag layers may be implemented to accomplish different objectives, such as: (a) ease of maintenance and recharge by decreasing the weight of individual porous bag layers 350; (b) use of porous bag layers containing different densities of ZVIF packing 400 to accomplish more efficient target substance removal; (c) the use of inserts composed of differing average cross-sectional diameter d of the metal fiber 400 to accomplish more efficient target substance removal, and combinations of (b) and (c) to accomplish more efficient target substance removal. The porous bottom on one porous bag layer 350 separates the porous bag layer 350 from each one another. The porous bag layers 350 may include layers 352, 354, 356, 358, 360, and 362, wherein each layer may include different densities of ZVIF packing 400, including, but not limited to, 1 pound cubic foot, 5 lb/ft$^3$, 10 lb/ft$^3$, 15 lb/ft$^3$, 20 lb/ft$^3$, 25 lb/ft$^3$, to 50 lb/ft$^3$. For example, the bottom layer 352 may include a density of 5 lb/ft$^3$ as to prevent clogging of the bottom layer 352. The middle layers 354, 358, 360, and 362 may have an increased density of 20 lb/ft$^3$, to permit increased selenium removal once the contaminated water is within the treatment cell 100. And the top layer 364 may include a density of 5 lb/ft$^3$. In one embodiment of the invention, the porous bag layers 350 include metal fibers of any cross-section diameter d at any density. The porous bag layer 350 can be of any thickness and weight, and the stacking of the porous bag layers 350 may be dictated by the system requirements, removal, and the like.

Figure 7E:
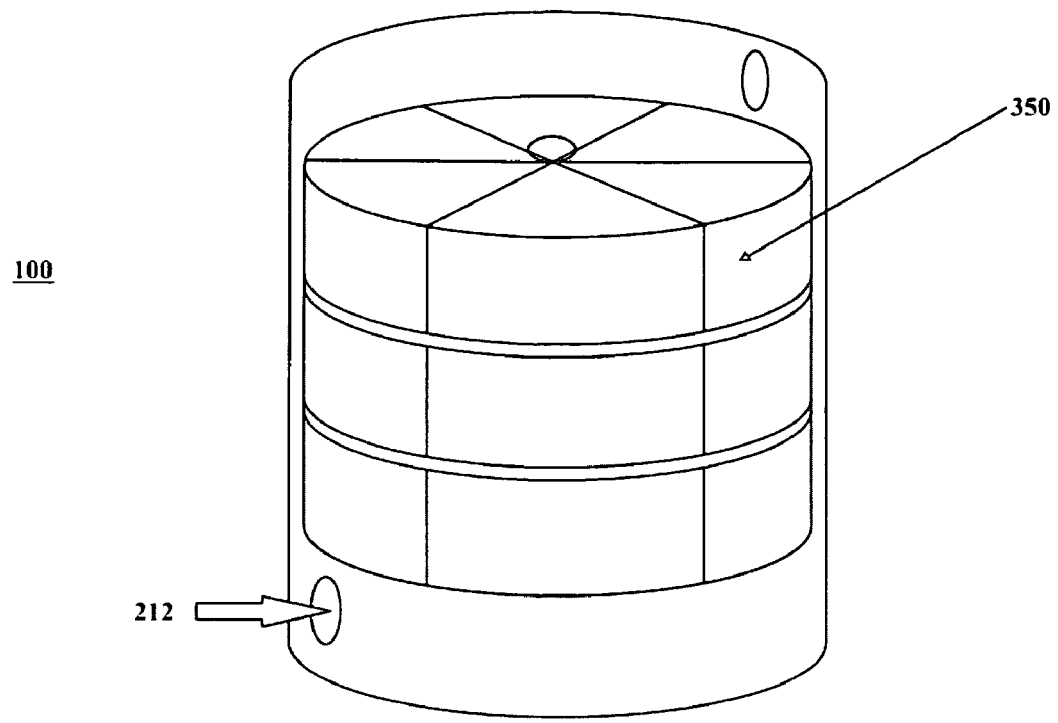
FIG. 7E is a perspective view of the treatment cell with the plurality of porous bag layers.
Figure 7F:
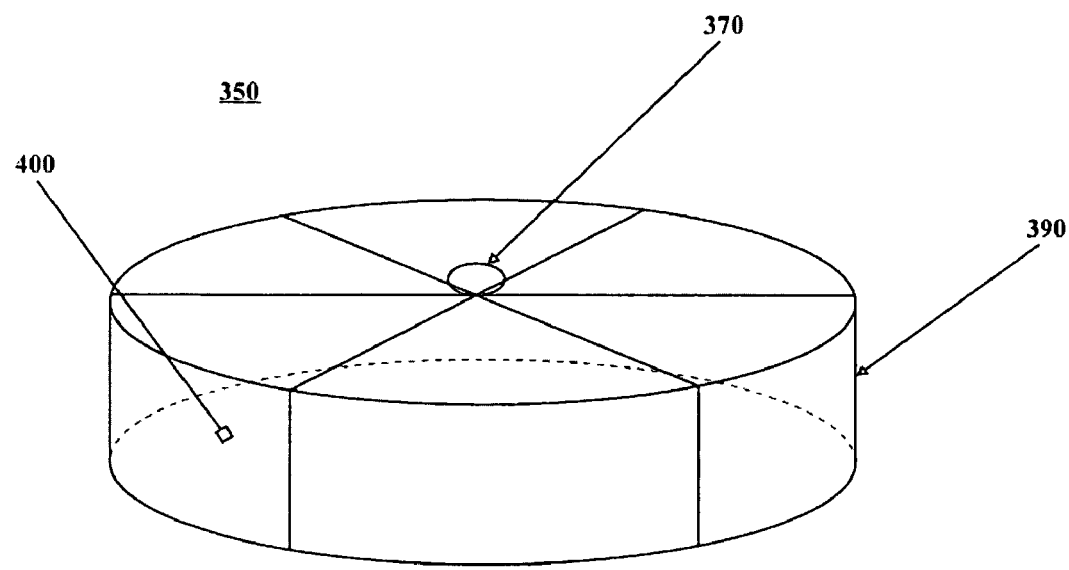

As shown in FIG. 7E, is a cut-away of treatment cell 100 with the plurality of porous bag layers 350. The porous bag layers 350 may be reinforced with straps spanning the diameter of the porous bag layers on the top and side layer. The porous bag layers 350 include the ZVIF packing 400 and are stacked upon each other to allow for replacement and removal of individual porous bag layers 350 as need be. The lift straps 370 are shown in FIG. 7F, as well as the reinforced porous bag material 390.

EXAMPLES

The following examples are put forth so as to provide those of ordinary skill in the art with a complete disclosure and description of how the processes, apparatuses, systems, and/or methods claimed herein are made and evaluated, and are intended to be purely exemplary and are not intended to limit the scope of processes, apparatuses, systems, and/or methods. Efforts have been made to ensure accuracy with respect to numbers (e.g., amounts, temperature, etc.), but some errors and deviations should be accounted for.

Example 1

Field Test

Figure 14:
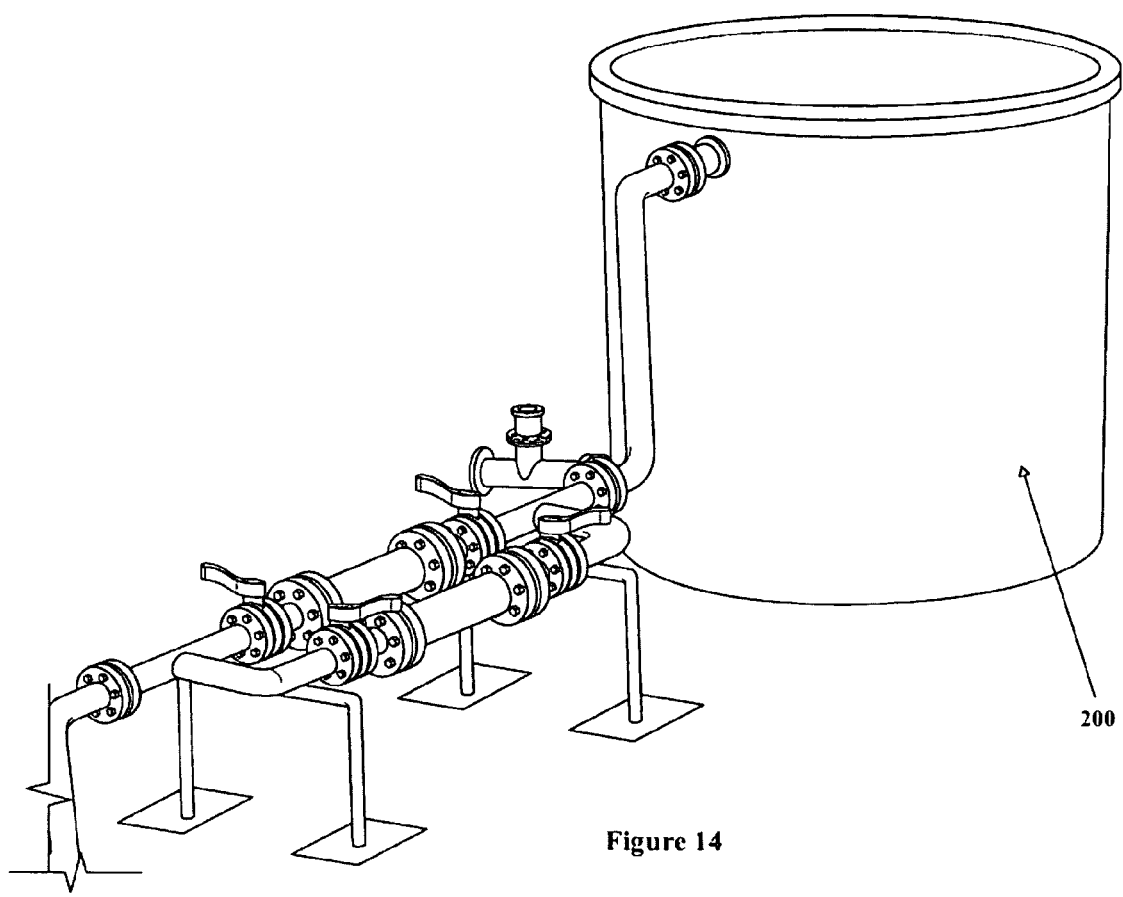
FIG. 14 is a treatment cell in a field test.

A field demonstration using ZVIF packing with a metal fiber 410 with an average fiber width of 50 μm in a nominal 1850 gallon container vessel 200 was evaluated, as shown FIG. 14. The container vessel 200 was installed at a surface mine and included a top-in inlet port. Piping was attached to divert mine drainage water from a pond into the top of the container vessel. The container vessel 200 was initially filled with 420 pounds of ZVIF packing 400.

Experimental

A container vessel 200 was installed that allowed top inflow and gravity exit of the mine water. The flow was roughly controllable by a valve at the outlet port. The container vessel 200 measured 6.8 feet in diameter and was 6.9 feet high. The container vessel 200 footprint measured 36 square feet. The ZVIF packing was loosely packed in the tank. Initially 420 pounds of ZVIF packing was loaded to a height of 5.5 feet. Over time the fill of the ZVIF packing settled and another 180 pounds was added, which filled the container vessel 200 to a height of 5.7 feet.

The inflow to and outflow from the container vessel 200 were tested approximately weekly for pH, selenium, iron, aluminum, and manganese concentrations. The contact time of the contaminated water with the ZVIF packing, or the residence time of the mine water can be roughly determined by calculating the volume in gallons of the bed, then determining the time it would take to displace that volume at the flow rate. This method suffers from inexact flow measurements over time (and deviations from perfect flow, such as channeling), but leads to residence times of from a little over one hour up to 16 hours. The great majority of the residence times were from 2.5 to 7.5 hours.

Results and Discussion

Figure 8:
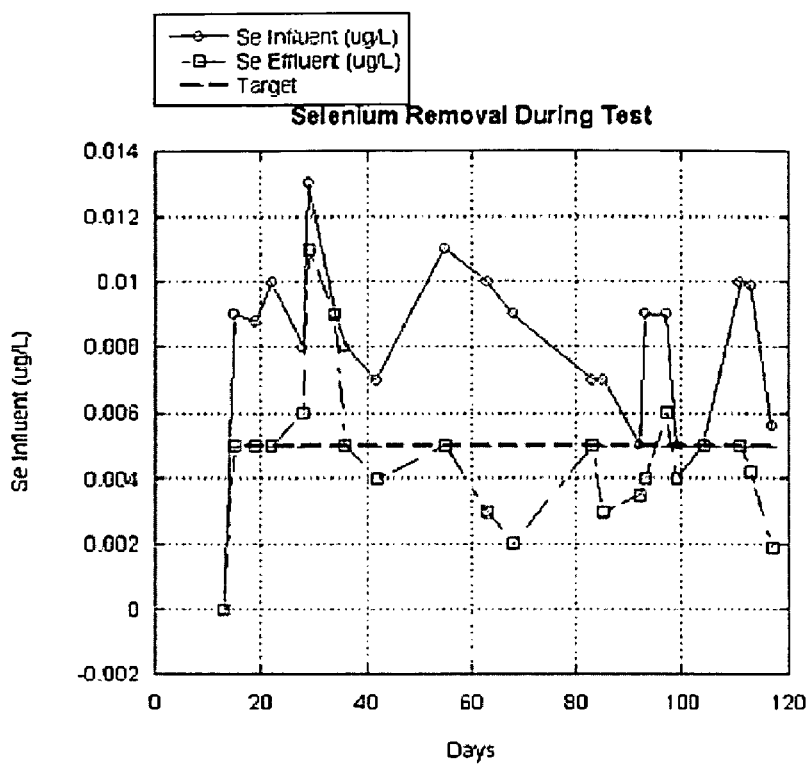
FIG. 8 is a plot of the selenium concentrations entering and leaving the treatment cell over the course of the field test.

As shown in FIG. 8, a plot of the selenium influent and effluent over time shows that in most instances, selenium is reduced below the 5 μg/L target level over a 120 day period.

Figure 9:
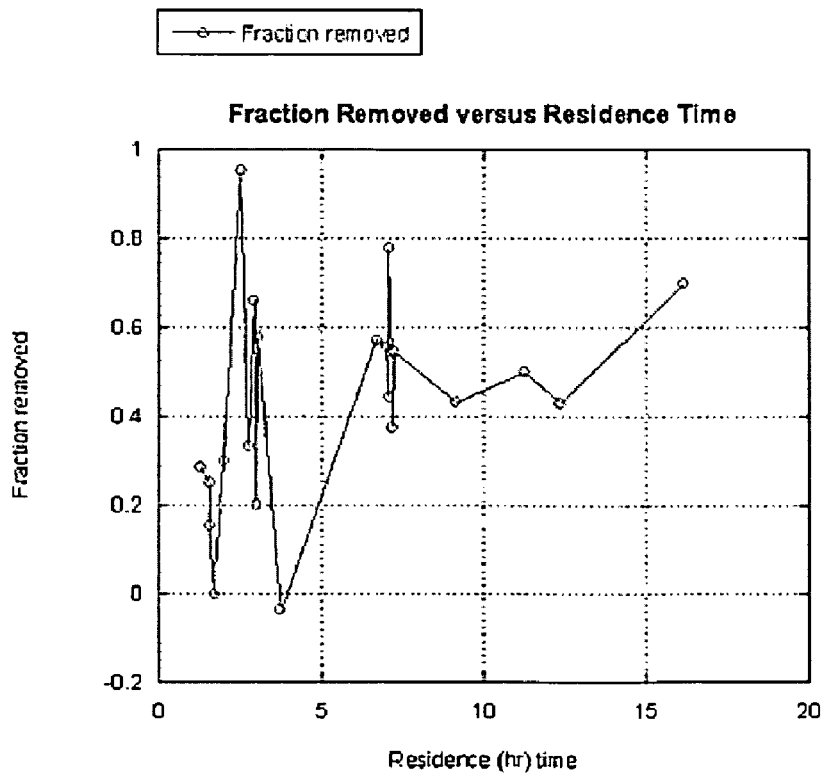
FIG. 9 is a plot of the fraction of initial Se removed as a function of residence time.

Other, more diagnostic relationships were also evaluated, notably the fraction of Se removed as a function of residence time, as shown in FIG. 9. FIG. 9 shows a general trend towards a higher fraction removed at higher residence time, but there are large fluctuations at low residence times and limitations in the chemical analyses. The conclusion that a greater than 40% of the selenium was removed from the treatment system at residence times longer than five hours is demonstrated.

Figure 10:
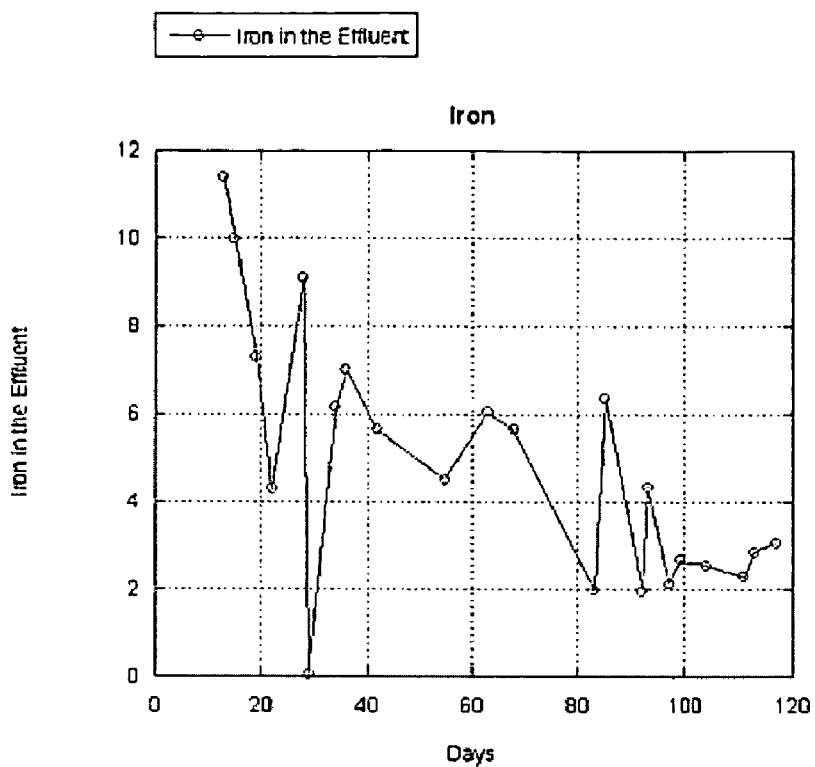
FIG. 10 is a plot of the iron removed as a function of the treatment time.

In addition to Se removal, the system released iron. Introduction of oxygen, and the actual reaction of the iron with the Se to a much lesser extent, will oxidize Fe metal to certain ferric oxides. The iron in the influent was usually immeasurable (<0.05 mg/L) but between 2 and 11 mg/L iron was in the effluent, as shown in FIG. 10. Analysis of the iron in filtered and unfiltered samples showed that all added iron was in the solid form. FIG. 10 shows a trend towards lower iron output with increasing time. This may indicate an improved inflow design or some decrease in the access of oxygen to iron, such as might occur if iron oxides coated the fiber particles.

Using the iron numbers and integrating over time shows that 47.5 pounds of the original 600 pounds of iron has been discharged. The integration is imprecise, but strongly indicates the rate of bed deterioration. The integration assumed that the flow and iron concentration were constant over the time period between measurements. The total iron loss as a result of measuring the outflow indicated that of the order of 10% of the iron is lost over a 4 month period. This is a manageable loss from the bed, and the iron discharge, since it is in solid form, can be removed by settling. No reports were given of any clogging in the system due to iron.

Figure 11:
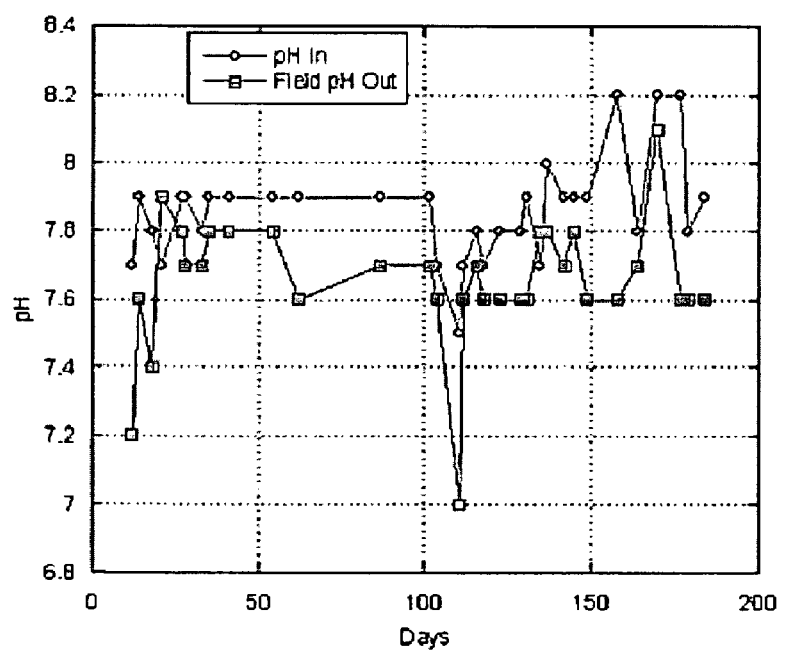
FIG. 11 is a plot of the pH of the system showing influent and effluent.

As shown in FIG. 11, a plot of the pH of the system showing influent and effluent, and drop of pH between the influent and effluent. The pH of the entry water was about 8 (which can support very little dissolved iron). The pH of the solution tends to decrease marginally, from about 8 to 7.5. The oxidation of metallic iron by oxygen, and its subsequent precipitation, produces protons that lower the pH, as in Equations (4) and (5). This is consistent with the generation of protons during the oxidation and precipitation of iron hydroxides in the bed.

Figure 12:
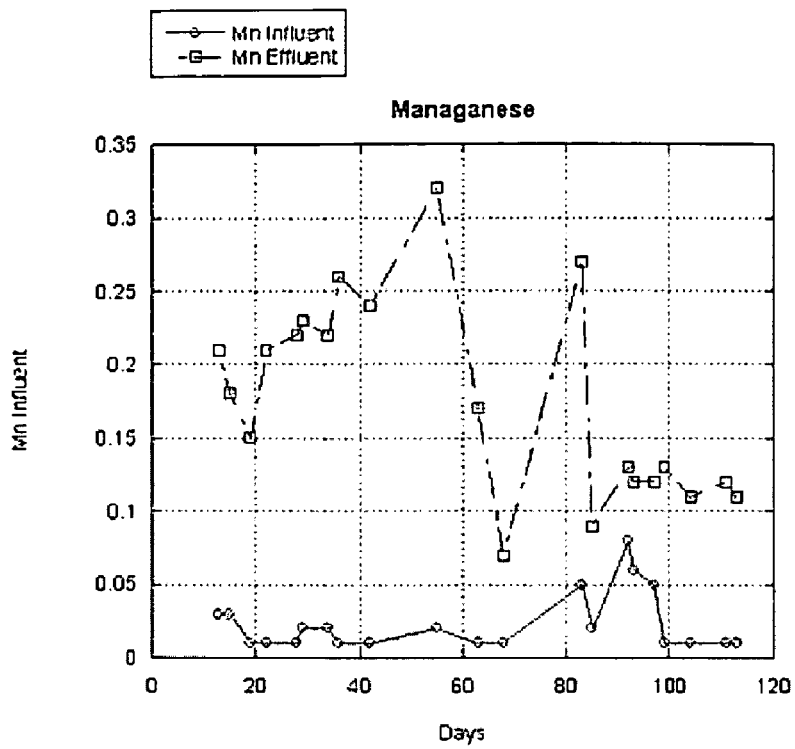
FIG. 12 is a plot of the manganese released from the bed over treatment duration.

The generation of manganese during treatment is shown in FIG. 12. The steel wool contains manganese to the level of a percent or more which oxidizes during the treatment process. The mechanism of manganese oxidation is unknown, but the amount released is roughly 1% of the amount of iron released, which is a fair indication that manganese is oxidized with iron. The amount of manganese released, as with iron, seems to decrease and stabilize over time.

Figure 13:
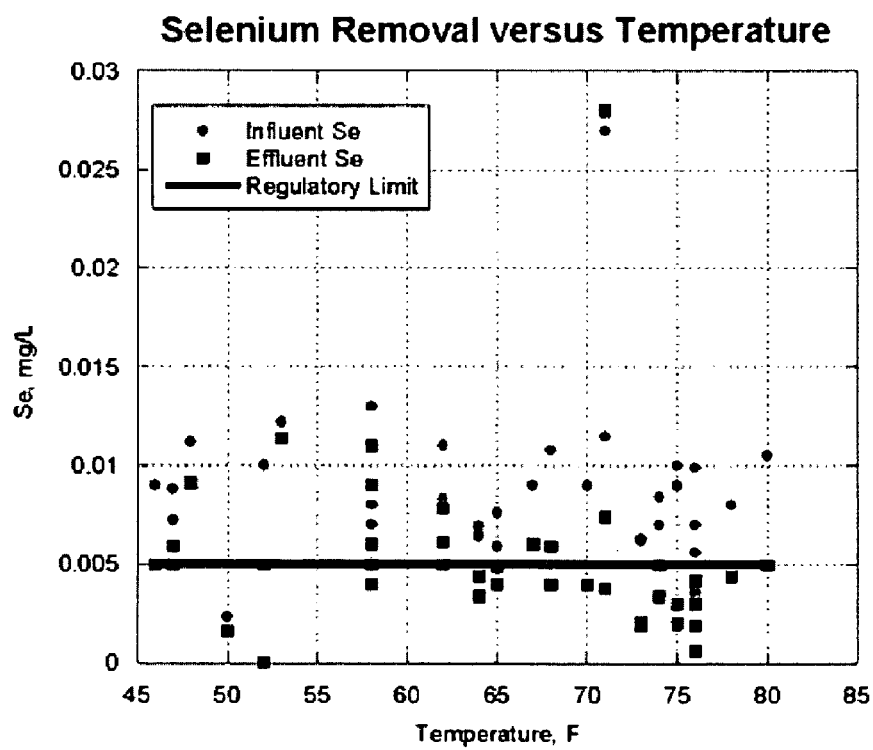
FIG. 13 is a plot of the selenium removal versus the temperature profile.

As shown in FIG. 13, a plot of the selenium removal versus the temperature profile. The plot shows rate effect of temperature on the selenium removal process.

CONCLUSION

The treatment test has consistently removed selenium from the incoming stream and in most instances to below 5 μg/L, despite imprecise flow control. Low flow rates and long residence times were consistently effective in removing selenium. Certain higher flow rates and shorter residence times were surprisingly effective, but selenium removal at short residence times in this test was unreliable. On occasion, some low residence times, as shown in FIG. 9, provide 50% removal rates. Treatment at 7 gallons per minute lowered the selenium content to 2 μg/L. The rate of bed deterioration is slow and manageable. The release of manganese is not substantial. Manganese, if it presents a problem, does have a known treatment chemistry, whereas selenium does not. Efforts to use low manganese source materials maybe the easiest solution. The treatment of selenium with zero-valent iron under field conditions is effective.

Example 2

Controlled Field Test

Figure 15:
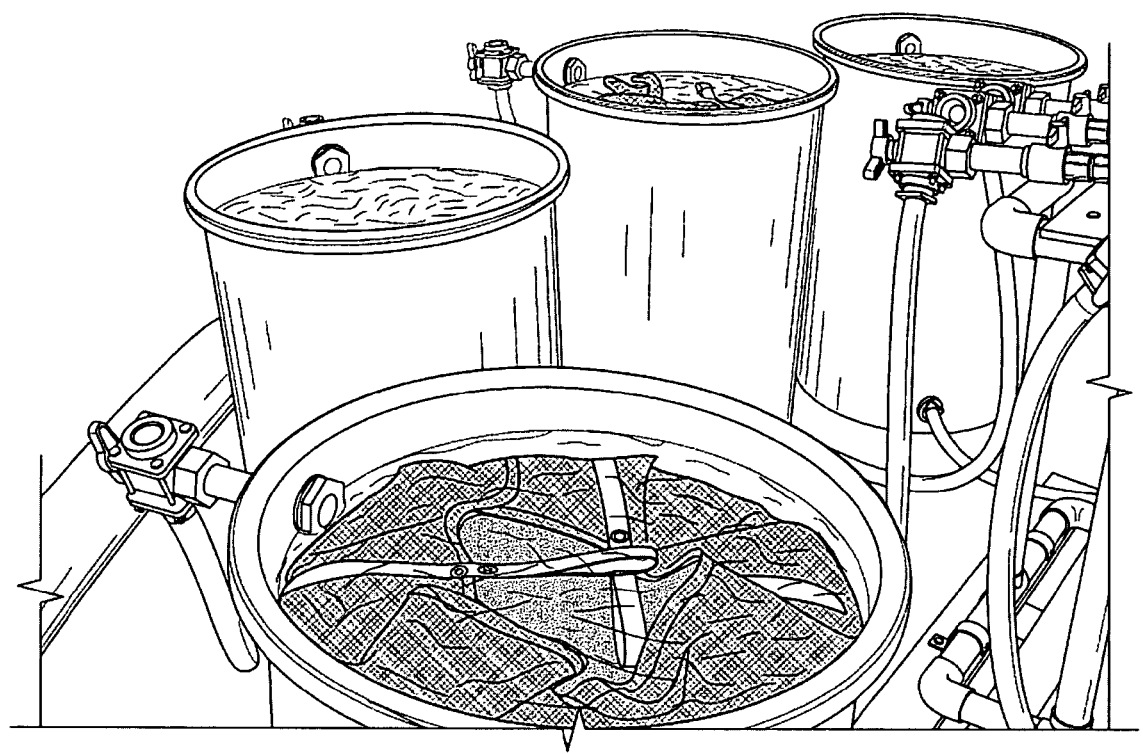
FIG. 15 is a treatment cell in a field test.
Figure 16:
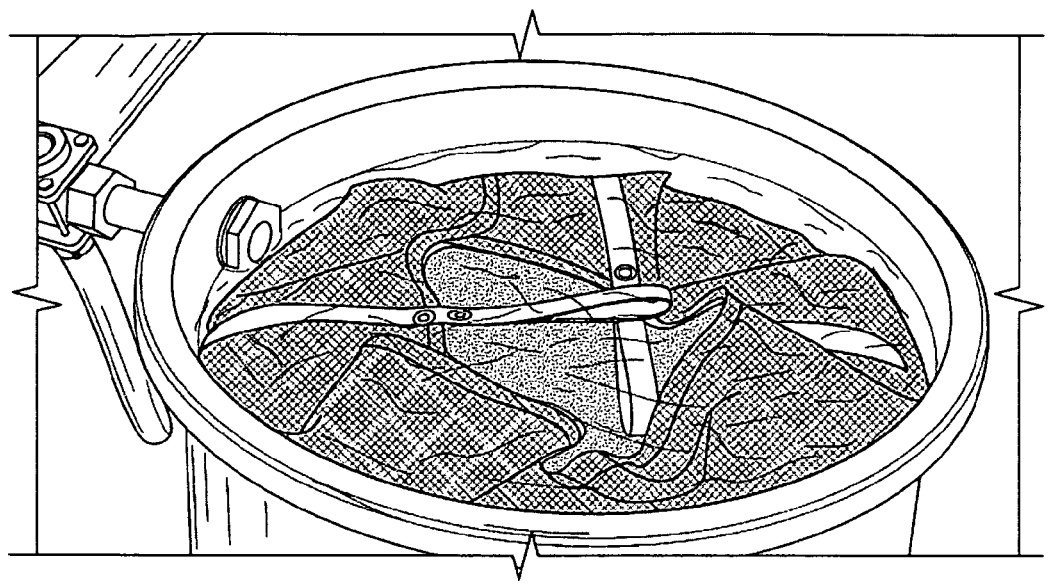
FIG. 16 is a treatment cell after 6 weeks of use.

Five Fifty five gallon treatment cells 100 of ZVIF packing 400 were installed in a different surface mine, as shown in FIG. 14. The five treatment cells contained a ZVIF packing 400 as follows: (1) 0.5 volume % of metal fibers 410 with a cross-section diameter d of 40 μm; (2) 1 volume % of metal fibers 410 with a cross-section diameter d of 40 μm; (3) 2 volume % of metal fibers 410 with a cross-section diameter d of 40 μm; (4) 1 volume % of metal fibers 410 with a cross-section diameter d of 60 μm; and (5) 1 volume % of metal fibers 410 with a cross-section diameter of 100 μm. A significant portion of the test involved establishing the hydraulics, so few chemical tests were plotted. At every residence time (all were near one hour) for the same fiber diameter, the higher density ZVIF packing 400 removed measurably more selenium. For the metal fibers with a cross-section diameter d of 40 microns, the 0.5 volume % treatment cell removed 11.7% of the incoming selenium at a 1.1 hour residence time. The 1 volume % treatment cell removed 25.5% at a residence time of 0.83 hour. The 2 volume % treatment cell removed 56.4% at a residence time of 2 hours. Maintaining high flow in the most densely packed treatment cell was difficult. The treatment cell packed with 1 volume % of metal fibers 410 with a cross-section diameter d of 60 μm removed 10.6% of the selenium with a residence time of 0.86 hour. The treatment cell filled with 1 volume % of metal fibers 410 with a cross-section diameter of 100 μm removed 13.8% of the selenium with a 0.86 hour residence time. No obvious fiber diameter dependence is seen for the last two treatment cells, but the 1 volume % 40 μm treatment cell removed 25.5% of the selenium as noted above. For reference, the other removal test contained 0.5 volume % of metal fibers 410 with a cross-section diameter d of 50 μm. These controlled drum tests reaffirm the removal of selenium by ZVIF and utilized the full treatment cell 100, notably use of the porous bags 300. FIG. 15 shows the fifty-five gallon treatment cell after 6 weeks of use.

Example 3

Bench Scale Evaluation of Zero-Valent Iron

The evaluation of zero-valent iron (iron metal) as a reductant for Se(IV) and Se(VI), where the product should be elemental Se(0).

The Experimental System

Figure 17:
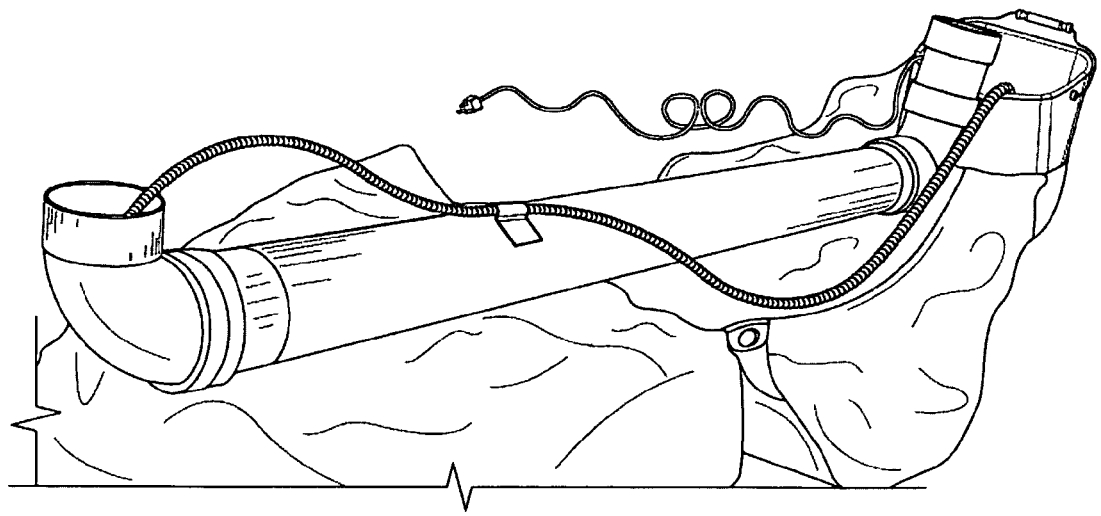
FIG. 17 is a perspective view of the bench scale water treatment system.
Figure 18:
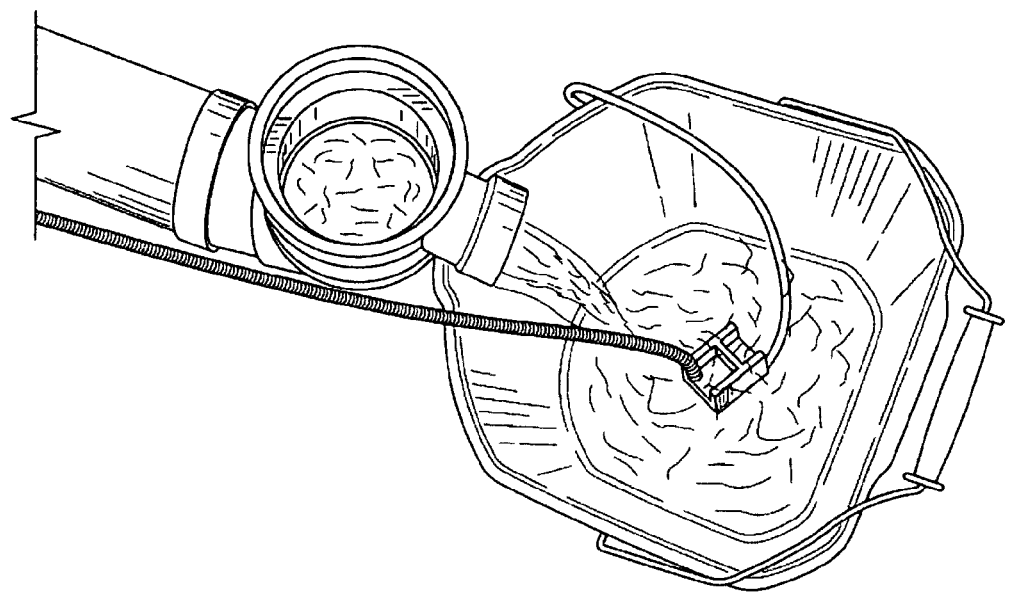
FIG. 18 is a vertical view of the treatment system showing the container, pump and outlet.

The system used consists of a five (5) foot length of 4 inch inside diameter Polyvinyl Chloride ("PVC") drain pipe with a 90 degree bend at both ends, as shown in FIG. 17. The exit end of the pipe also had a straight extension with a three (3) inch reduction output at 90 degrees, as shown in FIG. 18. A 120 gallon-per-hour submersible pump was used to recycle the mine drainage. The effluent was sampled and analyzed for Se and other metals at designed intervals.

Figure 19:
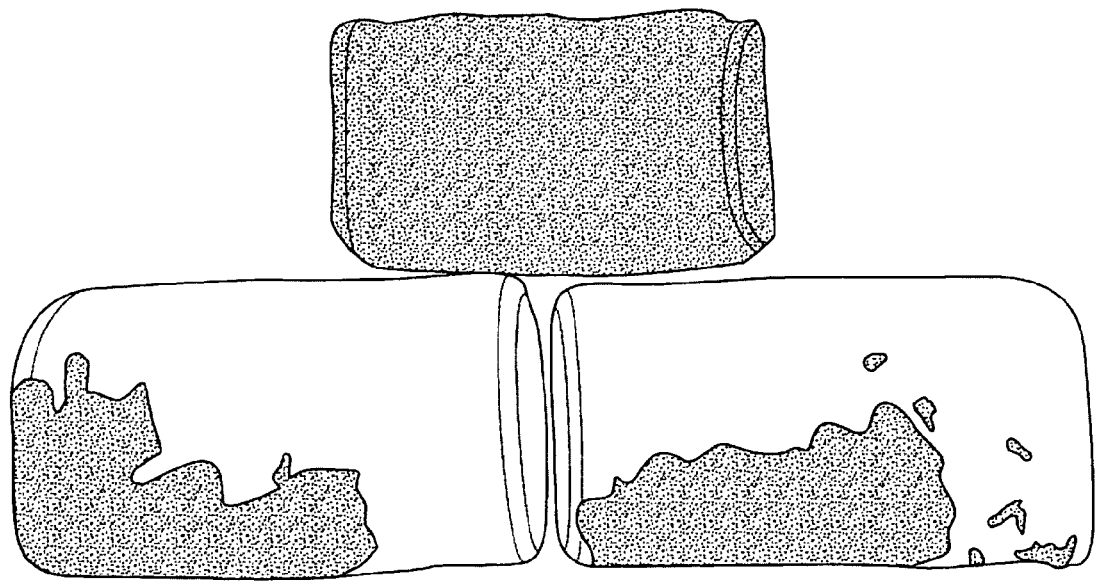
FIG. 19 is a perspective view of the ZVIF packing after the bench scale experiment.

The rate of selenium removal was 24 μg of Se/hour for the interval of 0-1 hours; 5.8 μg of Se/hour for the interval of 0-8 hours; 4.9 μg of Se/hour for the interval of 0-12 hours; and 3 μg of Se/hour for the interval of 6-12 hours. The steel wool pads after the bench test are shown in FIG. 19, where the top steel wool pad is a coarse pad and the two bottom steel wool pads are an extra fine pad.

FIG. 20 is a plot of the initial Se removal portion fit to an exponential curve for 0-6 hours. FIG. 21 is a plot of the selenium removal for 6-12 hours showing linear removal rates.

Example 4

Tank Bale

Figure 22:
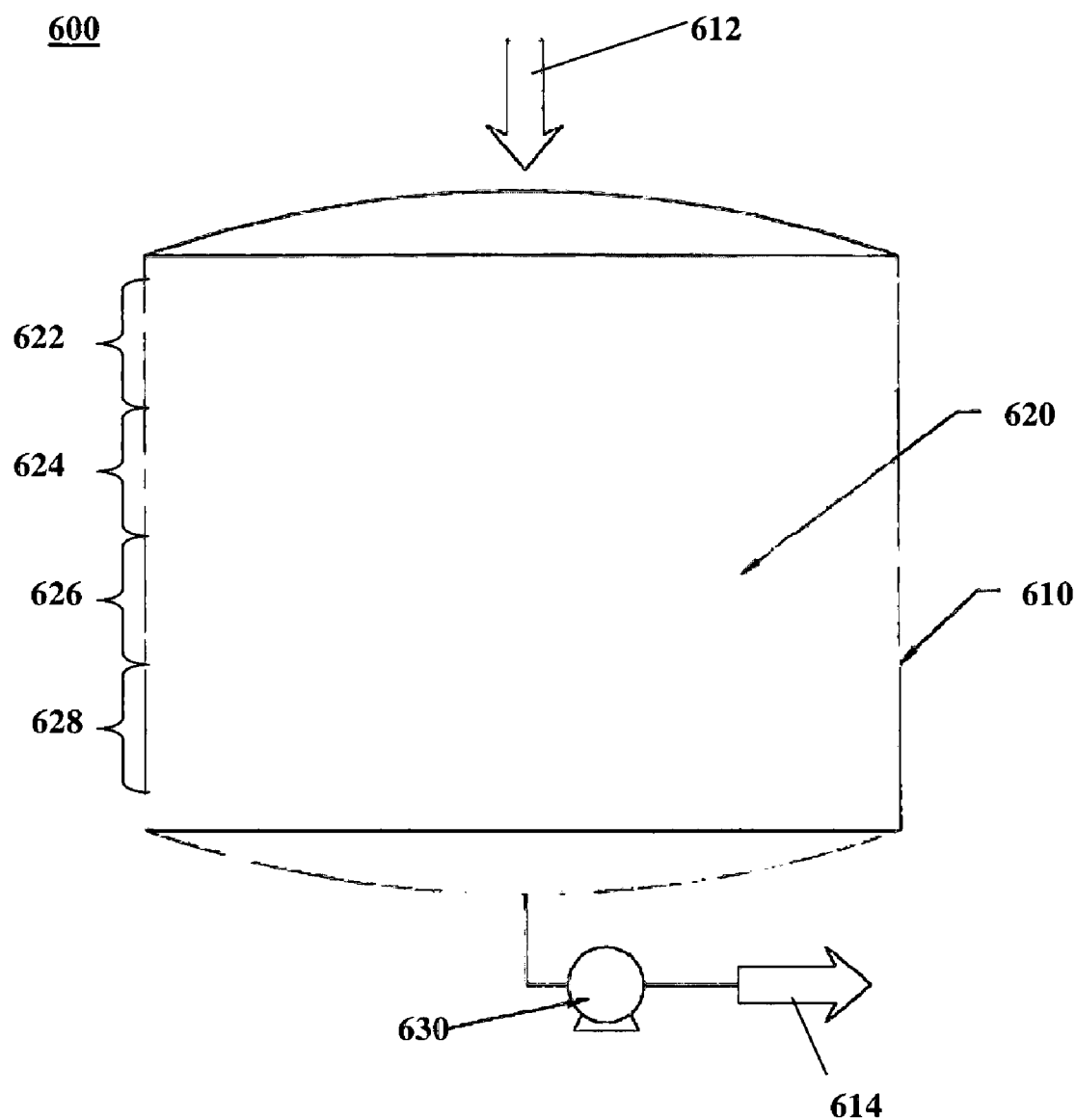
FIG. 22 is a side view of the tank bale embodiment.

As shown in FIG. 22, the tank bale embodiment 600 comprises a tank 610 and a plurality of loosely shaped Zero Valent Iron Fiber ("ZVIF") bales 620. Optionally, the tank bale 600 includes a pump 630 capable of generating suction or a vacuum. The ZVIF bales 620 may be compressed shaped ZVIF packings 400, where the ZVIF packings comprise a plurality of metal fibers 410 with a density D. The metal fibers 410 comprise an average cross-sectional diameter d. The ZVIF bales 620 approximately ranging in sizes of 12"×8"× 12" to 33"×36"×52" and ranging in weight between 30 to 500 pounds. Alternatively, the ZVIF bales range in sizes of 12"× 12"×12", 12"×20"×20" and ranging from 60 to 500 pounds. The density may be about 1 to about 10 lbs/gal, may be about 2 to about 8 lbs/gal, or may be about 4 to about 6 lbs/gal. The density of the ZVIF bales is optimized to treat a particular amount of fluid flow rate and allow for a particular contact time of the water of interest with the ZVIF bale 620.

The tank 610 ranges from sizes of 1,000 gallons to 15,000 gallons. Optionally, the tank may comprise a size to be included on a truck container, for example with the dimensions of 40'×8.5'×8', which is the size of truck containers. Alternatively, the tank 610 may comprise additional doors or openings for the quick removal and installment of ZVIF bales. The tank comprises an inlet port and an outlet port for the fluid flow of water. In operation, the contaminated water 612 flows into the tank 610 including the ZVIF bales and flows out 614 of the tank 610 with elements removed from the water by the ZVIF bales. Optionally, the pump 630 generates a suction or a vacuum in the tank 610 in order to draw the contaminated water through the bales in a low oxygen-containing environment.

Figure 23:
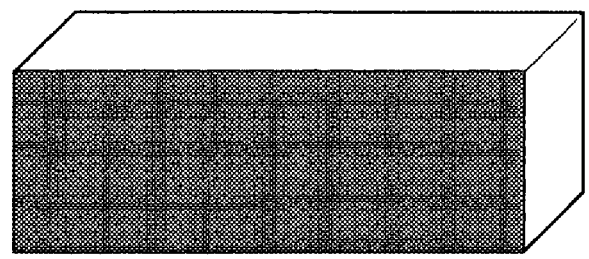
FIG. 23 is a perspective view of one embodiment of the bale.

In one embodiment, the ZVIF bales 620 comprise a cubical shape, as shown in FIG. 23; however, the bales may comprise any rectangular, polygonal, or polyhedron shape, either symmetrical or asymmetrical. The ZVIF bales include a density formed by a compression of the ZVIF packing 400. "Bale" is a term to mean a large closely pressed package of the ZVIF packing 400. Alternatively, the ZVIF bales may comprise a strapping surrounding the exterior surface of the bale to provide for lifting of the bale by a hook or other attachment. Compression of the ZVIF bales can be conducted by any compression machine 650, such as a MTS tension compression machine, hydraulic metal balers, and the like. In one embodiment, the ZVIF bale 620 is compressed using a 20 kN cell load. In one example, the baler's working hydraulic pressure is 2,000 psi and the target bale size is approximately 40 lbs measuring 12"×16"×8". The range of the baler's hydraulic pressure may range from +10% and −50%, which would make the range from 1,000 psi to 2,200 psi, respectively. The density of the ZVIF bale 620 is compressed to density including a porosity to permit fluid flow that travels through the ZVIF bale.

Figure 24:
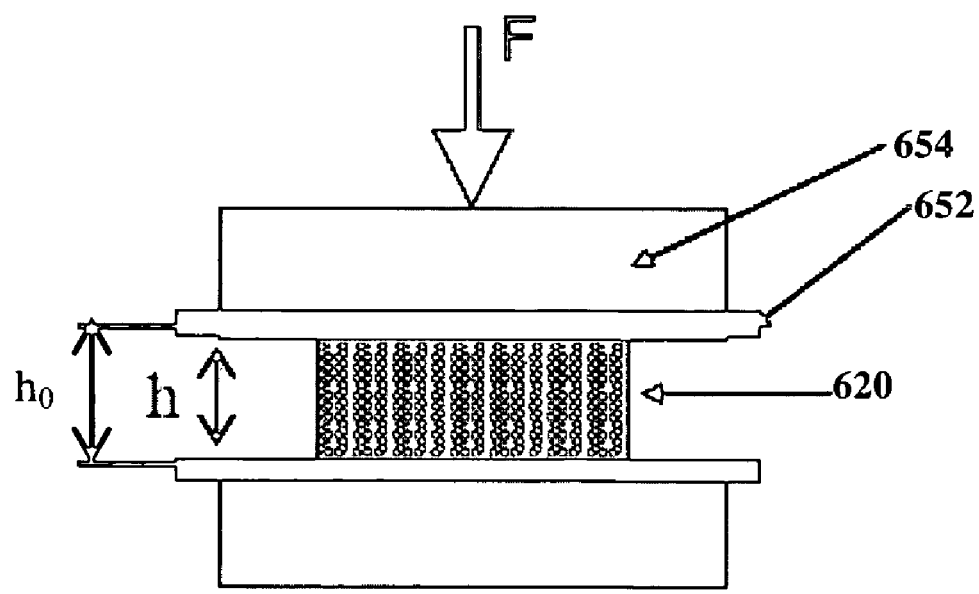
FIG. 24 a side schematic view of a compression machine, in embodiment.

As shown in FIG. 24, the ZVIF bales 620 are compressed between two plates 652 without any lubrication using hydraulic cylinders 654 with a force F of 2 kN cell load. A linear variable displacement transducer (LVDT) can measure the height displacement h between the two plates 652 from the initial height $h_0$ of the ZVIF. The LVDT resolution is 0.1% on a total displacement of 20 mm, which means a 20 μm resolution on displacement. Compressions can be conducted at a constant strain rate of 0.03 s$^{-1}$. The ZVIF bale undergoes unloading from which the Young's modulus, E, is obtained for a given strain. Numerous unloadings may be performed during the compression experiments to derive the Young's modulus versus the strain. A hysteresis may be observed during the loading/unloading cycles, which is often reported in the literature and may be attributed either to the friction between the fibers and/or irreversible fiber rearrangements. The true strain ε is converted into a density ρ from an initial density $ρ_0$ using the relationship in Equation (6):

$$\rho = \rho_0 \exp(-\varepsilon) \text{ with } \varepsilon = \ln\left(\frac{h}{h_0}\right) \quad (6)$$

Making use of these relations, the stress-strain curves may be redrawn as stress-density curves on a log-log scale. In these models micromechanical theory may be derived, based on contact point statistics and bending of fibers using beam theory. The aspect ratio of 400 makes such a hypothesis reasonable. The latter models yield the following relationship between the stress σ and the density ρ of random ZVIF fibers that deform by bending between fiber contact points:

$$\sigma = kE_f(\rho^n - \rho_c^n) \quad (7)$$

In Equation (7), the factor k is a single adjustable parameter of the model and accounts for orientation distribution and degree of crimp, as well as the constraints and loading direction of the fiber segments. $E_f$ is the fiber's Young's modulus. The exponent n, which is the slope of the stress-density curve on a log-log scale, is a function of the ZVIF bale structure: n=3 for a random 3D structure and n=5 for random 2D plane structure. Finally, $\rho_c$ is the threshold volume fraction (also called the packing density) below which the wool has no mechanical response. ZVIF bales with different initial surface masses can confirm the existence of threshold densities below which the ZVIF bales have no mechanical response. Any ZVIF bale that has another ZVIF bale stacked upon it will compress, at an infinitesimal level or greater. In one example, if the baler's hydraulic pressure is 2,000 psi and 100 forty lbs. bales are stacked upon each other (with a footprint of 12"×16"), the bottom bale may experience about 21 psi load, which is about $\frac{1}{100}^{th}$ of the baler's hydraulic pressure. The stacking pressure should not compress the ZVIF bales enough to appreciably change the flow rate thru the bales. In one embodiment, the ZVIF bales include an initial surface mass of 0.70 kg/m² with n=3.30 will have a packing density of ~0.015 kg/m². Beyond these, the linearity of the curves in this log-log scale can confirm the power-law relation between the stress and the density. From the loading curves, the tangent modulus E. From Equation (7) this modulus:

$$E_{tan\,g} = \frac{d\sigma}{d\varepsilon} = nkE_f\rho^n$$

is characterized by the same exponent n as the stress.

The Young's modulus, E, may be plotted as a function of the density rather than strain, on a log-log scale. For a given initial surface mass, the Young's modulus is a linear function of the density on the log-log scale and thus the Young's modulus has also a power-law relation with density: $E = \beta\rho^m$.

The exponents n and m are functions of the initial surface mass of the ZVIF bale and the exponents n and m increase as the surface mass increases. The exponents are larger than one, which is characteristic of entangled materials, in which the number of fiber to fiber contacts evolves during compression. By contrast the model developed for isotropic bonded fiber array predicts an exponent of 1. In addition, the higher the surface mass, the larger is the threshold density. Firstly, n and m present the same trend, which means that both the tangent modulus and the unloading modulus present identical evolution with the surface mass.

Secondly, the exponent (n or m) starts at low surface mass from a value of 3.5 increases linearly up to 4.5 and seems to stabilize to this value for a surface mass larger than 1.1 kg/m2. These values can be compared for two specific architectures: a 3D random structure gives an exponent of 3 and a 2D random plane structure an exponent of 5, whatever the surface mass. The values of exponents that is different from the two extreme cases since the architecture analysis shows that whatever the surface mass, the ZVIF bales can not be considered as a 3D random or even a 2D random fiber network. The exponent lies in between these two extreme case indicates that the structure of the ZVIF bale present an architecture that is in between the 2D random and the 3D random. The variation can be correlated to the change of structure of the ZVIF bale with the surface mass.

As shown in FIG. 22, in one embodiment of the invention, the tank 600 may include a plurality of ZVIF bale layers 622, 624, 626, and 628 of different densities. The ZVIF bale layers 350 may be discrete and separate layers, where each ZVIF bale layer may include a specific density of ZVIF bales. The plurality of bale layers may be implemented to accomplish different objectives, such as: (a) ease of maintenance and recharge by decreasing the weight of individual bale layers; (b) use of bale layers compressed at different densities to accomplish more efficient target substance removal; (c) the use of bale layers composed of differing average cross-sectional diameter d of the metal fiber to accomplish more efficient target substance removal, and combinations of (b) and (c) to accomplish more efficient target substance removal. The bale layers are separated from each one another by adjoining ZVIF bales. The bale layers 350 may include layers 622, 624, 626, 628, wherein each layer may include different densities of ZVIF bales, including, but not limited to, 1 to about 10 lb/gal. For example, the bottom bale layer 628 may include a density of 1 lbs/gal as to prevent clogging of the bottom bale layer. The middle layers 624 and 626 may have an increased density of 10 lb/gal, to permit increased selenium removal once the contaminated water is within the treatment cell 100. And the top layer 364 may include a density of 5 lb/gal. In one embodiment of the invention, the bale layers include metal fibers of any cross-section diameter d at any density. The bale layer can be of any thickness and weight, and the stacking of the bale layers 350 may be dictated by the system requirements, removal, and the like.

Example 4

ZVI Seeding

An alternative process is designed to precipitate and adsorb heavy metals from aqueous solution via zero valent reaction using ZVI bales or ZVIF inserts directing in polluted water. Direct seeding of ponds, seep flowage and other waterways with ZVI bales or inserts provides the benefit of in situ treatment methods. Alternative embodiments include direct submersion of ZVI in many forms such as bales, webs, and fibers either with or without mechanical support. After the ZVI bales or inserts have reacted with polluted water, the ZVI inserts or bales may be removed with a crane or similar device. Alternatively, the reacted water may be drained from the polluted site, such that the ZVI bales or inserts are left remaining to be removed by waste removal means, dump truck and the like.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for removing metal elements from a fluid comprising:
    a. passing a fluid comprising a plurality of metal elements to be removed through a plurality of bales including zero valent metal fibers having a packing density D and an average cross-sectional diameter d; and
    b. reacting the plurality of metal elements with the plurality of packed zero valent metal fibers, wherein the plurality of bales include a first bale layer and a second bale layer and the first bale layer and the second bale layer each include compressed zero valent metal fibers, wherein the first bale layer includes a packing density D different from a packing density D in the second bale layer, to remove the metal elements from the fluid.

2. The process of claim 1, wherein the metal fibers comprise zero valent iron.

3. The process of claim 2, wherein the reacting step further comprises the step of reducing the plurality of metal elements in the fluid with the plurality of packed zero valent metal fibers and retaining reduced metal elements within the bales.

4. The process of claim 3, wherein the plurality of metal elements are selected from the group consisting of selenium, selenate and selenite.

5. The process of claim 1, wherein the packing density D in the passing step further comprises a packing density D between about 1 to about 10 lbs/gal.

6. The process of claim 1, wherein the average cross-sectional diameter d of the metal fibers range between about 10 and 500 microns.

7. The process of claim 6, wherein the plurality of bales includes a third bale layer with includes a packing density D the same as the first bale layer.

8. The process of claim 7, wherein the plurality of bales comprise a shape selected from the group consisting of cubical shape, rectangular shape, polygonal shape, and polyhedron shape.

9. The process of Claim 7, wherein the first bale layer includes metal fibers comprising a first average cross-sectional diameter d and the second bale layer includes metal fibers comprising a second average cross-sectional diameter d, whereby the first average cross-sectional diameter d is different than the second average cross-sectional diameter.

10. A process for removing metal elements from a fluid comprising:
    a. passing a fluid comprising a plurality of metal elements to be removed by a plurality of bales including metal fibers having a zero valence state and an average cross-sectional diameter d, wherein the plurality of bales include a packing density D and are compressed into a cubical configuration;
    b. the plurality of bales further comprising a first bale layer and a second bale layer disposed within a tank, wherein the first bale layer includes a higher packing density than the second bale layer; and
    c. reacting the plurality of metal elements with the plurality of packed zero valent metal fibers, to remove the metal elements from the fluid.

11. The process of claim 10, wherein the metal fibers comprise zero valent iron.

12. The process of claim 11, wherein the reacting step further comprises the step of reducing the plurality of metal elements in the fluid with the plurality of packed zero valent metal fibers and retaining reduced metal elements within the bales.

13. The process of claim 12, wherein the reduced metal elements are selected from the group consisting of selenium, selenate and selenite.

14. The process of claim 10, wherein the packing density D of the first bale layer and the second bale layer is between about 1 to about 10 lbs/gal.

15. The process of claim 10, wherein the average cross-sectional diameter d of the metal fibers range between about 10 and 500 microns.

16. The process of claim 15, further comprising operably coupling the tank to a vacuum.

17. A process for removing metal elements from a fluid, comprising:
    a. passing a fluid comprising a plurality of elements to be removed by a plurality of bales including a plurality of metal fibers having a zero valence state, wherein the plurality of bales further comprises a plurality of bale layers and the plurality of bale layers include a first bale layer and a second bale layer;
    b. packing the metal fibers of the first bale layer at a first density D and packing the metal fibers of the second bale layer at a second density D, wherein the first density D is different than the second density D;
    c. reacting the plurality of elements with the plurality of metal fibers at the first density D and the second density D sufficient to remove the plurality of elements in the fluid in a tank.

18. The process of claim 17, wherein the metal fibers comprise zero valent iron.

19. The process of claim 17, wherein the packing density D of the first bale layer and the second bale layer is between about 1 to about 10 lbs/gal.

20. The process of claim 17, wherein the plurality of elements are selected from the group consisting of selenium, selenate and selenite.

* * * * *